United States Patent
Lu et al.

(10) Patent No.: US 9,245,580 B1
(45) Date of Patent: Jan. 26, 2016

(54) SYSTEMS AND METHODS FOR THREE READER STORAGE ACCESS

(71) Applicant: Avago Technologies General IP (Singapore) Pte. Ltd., Singapore (SG)

(72) Inventors: Lu Lu, San Jose, CA (US); Haitao Xia, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/529,561

(22) Filed: Oct. 31, 2014

(51) Int. Cl.
- *G11B 20/20* (2006.01)
- *G11B 20/10* (2006.01)
- *G11B 5/09* (2006.01)

(52) U.S. Cl.
CPC ............... *G11B 20/10046* (2013.01)

(58) Field of Classification Search
CPC .. G11B 20/20; G11B 20/16; G11B 20/10529; G11B 20/10009; G11B 20/1419; G11B 20/18; G11B 5/02; G11B 5/11; G11B 5/012; G11B 5/09
USPC ........... 360/22, 24, 39, 25, 32, 42, 55, 65, 67; 369/44.41, 44, 42
See application file for complete search history.

(56) References Cited

U.S. PATENT DOCUMENTS

| | | | |
|---|---|---|---|
| 7,742,556 B1 | 6/2010 | Qian et al. | |
| 8,111,596 B2 * | 2/2012 | Sakai | G11B 7/0906 369/44.29 |
| 8,599,508 B1 | 12/2013 | Burd | |
| 8,837,068 B1 | 9/2014 | Liao et al. | |

* cited by examiner

*Primary Examiner* — Nabil Hindi

(57) ABSTRACT

Systems and method relating generally to data processing, and more particularly to systems and methods for utilizing multiple data streams for data recovery from a storage device.

20 Claims, 10 Drawing Sheets

SYSTEMS AND METHODS FOR THREE READER STORAGE ACCESS

FIELD OF THE INVENTION

Systems and methods relating generally to data processing, and more particularly to multi-sensor access of data from a storage medium.

BACKGROUND

A storage medium may include a number of tracks to which data is stored. In a common scenario, a sensor is flown over the respective tracks to sense the data stored on the track. In some cases misalignment of the sensor relative to the track results in noisy or incorrect data being sensed. In such cases, it is difficult to recover data from the storage medium.

Hence, for at least the aforementioned reasons, there exists a need in the art for advanced systems and methods for accessing data from a storage medium.

SUMMARY

Systems and methods relating generally to data processing, and more particularly to multi-sensor access of data from a storage medium.

Various embodiments of the present invention provide data processing systems that include a head, a first interpolator circuit, a second interpolator circuit, a third interpolator circuit, a fourth interpolator circuit, a first offset determination circuit, and a second offset determination circuit. The head includes a first read sensor, a second read sensor and a third read sensor. The first interpolator circuit modifies the phase of a first data set derived from the first sensor based upon a first phase feedback to yield a first modified data set, the second interpolator circuit modifies the phase of a second data set derived from the second sensor based upon the first phase feedback to yield a second modified data set, the third interpolator circuit modifies the phase of the second data set derived from the second sensor based upon a second phase feedback to yield a third modified data set. The fourth interpolator circuit modifies the phase of the third data set derived from the third sensor based upon the second phase feedback to yield a fourth modified data set. The first offset determination circuit provides the first phase feedback that is based upon a combination of the first modified data set and the second modified data set, and the second offset determination circuit provides the second phase feedback that is based upon a combination of the third modified data set and the fourth modified data set.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 5c depicts a combination gain, DC offset, and magneto resistive asymmetry (MRA) modification circuit that may be used in relation to the three head circuit of FIG. 5a;

DETAILED DESCRIPTION OF SOME EMBODIMENTS

Figure 1:
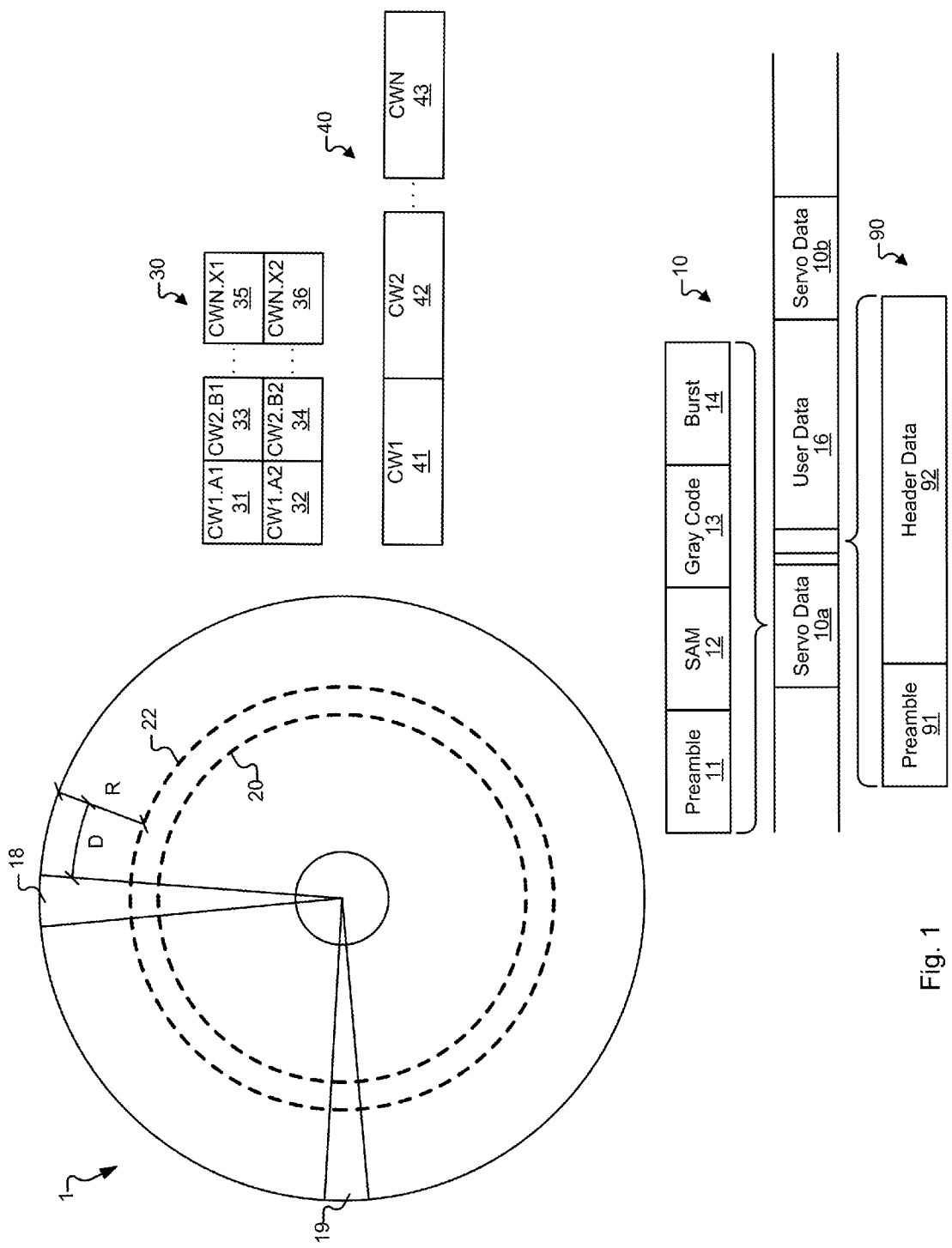
FIG. 1 is a block diagram of a storage medium and sector data schemes that may be used with a data processing system using multiple read sensors in accordance with one or more embodiments of the present invention.

Systems and methods relating generally to data processing, and more particularly to multi-sensor access of data from a storage medium.

Various embodiments of the present invention provide data processing systems that include a head, a first interpolator circuit, a second interpolator circuit, a third interpolator circuit, a fourth interpolator circuit, a first offset determination circuit, and a second offset determination circuit. The head includes a first read sensor, a second read sensor and a third read sensor. The first interpolator circuit modifies the phase of a first data set derived from the first sensor based upon a first phase feedback to yield a first modified data set, the second interpolator circuit modifies the phase of a second data set derived from the second sensor based upon the first phase feedback to yield a second modified data set, the third interpolator circuit modifies the phase of the second data set derived from the second sensor based upon a second phase feedback to yield a third modified data set. The fourth interpolator circuit modifies the phase of the third data set derived from the third sensor based upon the second phase feedback to yield a fourth modified data set. The first offset determination circuit provides the first phase feedback that is based upon a combination of the first modified data set and the second modified data set, and the second offset determination circuit provides the second phase feedback that is based upon a combination of the third modified data set and the fourth modified data set.

In some instances of the aforementioned embodiments, the first interpolator circuit, the second interpolator circuit, the third interpolator circuit, and the fourth interpolator circuit are digital interpolator circuits. In various instances of the aforementioned embodiments, modifying the phase of the first data set based upon the first phase feedback is done during a tracking mode post-header data is being processed. In some cases, the first interpolator circuit is also operable to modify the phase of the first data set base upon a phase correction input during an acquisition mode when header data is being processed. In one particular case, the first offset determination circuit includes: a first equalizer circuit operable to equalize the first modified data set to yield a first equalized data set, second equalizer circuit operable to equalize the second modified data set to yield a second equalized data set, a summation circuit operable to sum the first equalized data set with the second equalized data set on an element by element basis to yield a sum, a data detector circuit operable to apply a data detection algorithm to the sum to yield a decision output, and a second order loop filter circuit operable to generate the first phase feedback using the decision output.

In one or more instances of the aforementioned embodiments, the first phase determination circuit includes a Viterbi algorithm data detector circuit operable to determine decisions based upon a combination of both the first modified data set and the second modified data set. In some cases, the system is implemented as part of an integrated circuit. In particular cases, the system is implemented as part of a storage device. The storage device includes a storage medium where the head is disposable over the storage medium such that the first read sensor is disposed primarily over a first track on the storage medium and the third read sensor is disposed primarily over a second track of the storage medium while the second read sensor is partially disposed over both the first track and the second track.

In some instances of the aforementioned embodiments, the system further includes: a first analog front end circuit applying a first variable gain to a first input derived from the first read sensor to yield a first analog output from which the first data set is derived; a second analog front end circuit applying a second variable gain to a second input derived from the second read sensor to yield a second analog output from which the second data set is derived; and a third analog front end circuit applying a third variable gain to a third input derived from the third read sensor to yield a third analog output from which the third data set is derived. In some cases, the second variable gain is controlled based upon a combination of the second modified data set and the third modified data set.

Other embodiments of the present invention provide storage systems that include: a first interpolator circuit, a second interpolator circuit, a third interpolator circuit, and an offset determination circuit. The first interpolator circuit modifies the phase of a first data set derived from a first sensor based upon a first phase feedback to yield a first modified data set, the second interpolator circuit modifies the phase of a second data set derived from a second sensor based upon a second phase feedback to yield a second modified data set, and the third interpolator circuit modifies the phase of a third data set derived from a third sensor based upon a third phase feedback to yield a third modified data set. The offset determination circuit provides the first phase feedback. The offset determination circuit includes: an acquisition mode offset calculation circuit operable to calculate a first phase offset based upon a first input data set derived from the first sensor; a tracking mode offset calculation circuit operable to calculate a second phase offset based upon the first input data set; and a selector circuit operable to: select the first phase offset as a phase update when processing header data, and select the second phase offset as the phase update when processing post header data. The first phase feedback is calculated based upon the phase update.

In some instances of the aforementioned embodiments, the acquisition mode offset calculation circuit includes a zero phase sequence calculation circuit. In one or more instances of the aforementioned embodiments, the tracking mode offset calculation circuit includes a second order timing loop circuit. In various cases, the offset determination circuit further comprises a summation circuit operable to subtract the first phase feedback from the phase update to update the first phase feedback.

Turning to FIG. 1, a storage medium 1 is shown with two exemplary tracks 20, 22 that are adjacent to one another and indicated as dashed lines. The tracks are divided into sectors by servo data written within wedges 19, 18. These wedges include servo data 10 that are used for control and synchronization of a read/write head assembly over a desired location on storage medium 1. In particular, this servo data generally includes a preamble pattern 11 followed by a sector address mark 12 (SAM). Sector address mark 12 may include wedge identification information followed by the SAM. Sector address mark 12 is followed by a Gray code 13, and Gray code 13 is followed by burst information 14. Gray code 13 may include track identification information. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 includes some synchronization and header data 90 that includes a preamble pattern 91 and a head data 92 followed by user data within user data region 16. Based upon the disclosure provided herein, one of ordinary skill in the art will recognize a variety of data that may be included in header data 92.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. When reading data in user data region 16, synchronization to the data is done through use of preamble 91. In a write operation, the sensor would sense servo data from wedge 19 then write data to the user data region between wedge 19 and wedge 18. Then, the sensor would be switched to sense a remaining portion of the user data region followed by the servo data from wedge 18. Of note, wedges 18, 19 follow arcs corresponding to the geometry of an arm and pivot as is known in the art.

Codewords may be stored to the tracks on storage medium 1 in two different formats. In a parallel format 30, a given codeword is distributed across two tracks (e.g., tracks 20, 22). Parallel format 30 includes writing a first portion (e.g., CW1.A1 31) of a codeword to a first track and a second portion (e.g., CW1.A2 32) of the same codeword to a second track adjacent to the first track. This is followed by first portions of other codewords (e.g., CW2.B1 33, CWN.X1 35) stored serially along the first track, and second portions of other codewords (e.g., CW2.B2 34, CWN.X2 36) stored serially along the second track. The portions along the first track may be co-positioned with the portions along the second track such that portions for the same codeword can be read in parallel with one sensor of the head being disposed over one track and another sensor of the head disposed over the second track. Such parallel distribution of codeword portions allow for accessing a given codeword using multiple heads at a greater rate than if the codewords were accessed from a single track. In a serial format 40, codewords (e.g., CW1 41, CW2 42 and CWN 43) are placed in serial fashion along one track.

Figure 2:
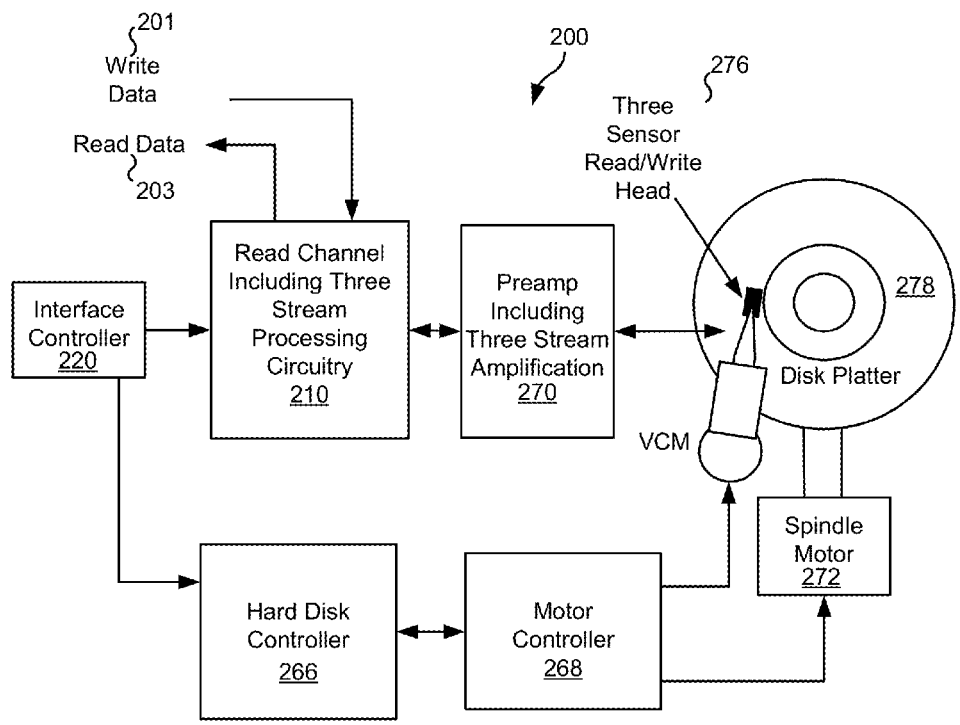
FIG. 2 shows a storage system that includes a three sensor read/write head, a preamplifier circuit including three stream amplification, and a read channel having three stream processing circuitry in accordance with various embodiments of the present invention.

Turning to FIG. 2, a storage system 200 is shown that includes a three sensor read/write head 276, a preamplifier circuit 270 including three stream amplification, and a read channel 210 having three stream processing circuitry in accordance with various embodiments of the present invention. Storage system 200 may be, for example, a hard disk drive. Storage system 200 also includes an interface controller 220, a hard disk controller 266, a motor controller 268, a spindle motor 272, and a disk platter 278. Three sensor read/write head 276 includes three read heads distributed at different locations along the read/write head. In some cases, three sensor read/write head 276 may be disposed in relation to disk platter 278 such that all of the three sensors are disposed at least partially over the same track. In other cases, three sensor read/write head 276 may be disposed in relation to disk platter 278 such that two of the three read sensors are disposed primarily over one track, and the third of the three read sensors is disposed over a different track. In yet other cases, three sensor read/write head 276 may be disposed in relation to disk platter 278 such that one of the three read sensors is disposed primarily over a first track, another of the three read sensors is disposed primarily over a second track, and a third of the three read sensors is disposed partially over both the first track and the second track. The disposition of three sensor read/write head 276 relative to the tracks on disk platter 278 allows the sensors to focus on accessing data from a single track at a time, or from two or more tracks at a time.

Interface controller 220 controls addressing and timing of data to/from disk platter 278, and interacts with a host controller (not shown). The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, read/write head 276 is accurately positioned by motor controller 268 over a desired data track on disk platter 278. Motor controller 268 both positions read/write head 276 in relation to disk platter 278 and drives spindle motor 272 by moving read/write head assembly 276 to the proper data track on disk platter 278 under the direction of hard disk controller 266. Spindle motor 272 spins disk platter 278 at a determined spin rate (RPMs). Once read/write head 276 is positioned adjacent the proper data track, magnetic signals representing data on disk platter 278 are sensed by each of the sensors included in three sensor read/write head 276 as disk platter 278 is rotated by spindle motor 272. The sensed magnetic signals are provided as a continuous, minute analog signal representative of the magnetic data on disk platter 278 with a signal stream being provided from each of the three sensors. These three minute analog signals are transferred from three sensor read/write head 276 to read channel circuit 210 via preamplifier 270. Preamplifier 270 is operable to amplify the three minute analog signals accessed from disk platter 278. In turn, read channel circuit 210 processes the three amplified signals including combining the signals and applying data decoding to the combined signals to recreate the information originally written to disk platter 278. This data is provided as read data 203 to a receiving circuit. A write operation is substantially the opposite of the preceding read operation with write data 201 being provided to read channel circuit 210. This data is then encoded and written to disk platter 278.

The processing applied to the three signal sets derived from the respective sensors included in three sensor read/write head 276 involves aligning data derived from the respective sensors before combining the data into a streams for processing by data decoder and data detection circuitry. The aligning relies on signal processing done by, for example, the signal alignment circuits discussed below in relation to one of FIG. 3 or FIG. 5. Further, the alignment process may be performed using the methods discussed below in relation to one of FIG. 4 or FIG. 6.

It should be noted that storage system 200 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 210 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 200 may be modified to include solid state memory that is used to store data in addition to the storage offered by disk platter 278. This solid state memory may be used in parallel to disk platter 278 to provide additional storage. In such a case, the solid state memory receives and provides information directly to read channel circuit 210. Alternatively, the solid state memory may be used as a cache where it offers faster access time than that offered by disk platted 278. In such a case, the solid state memory may be disposed between interface controller 220 and read channel circuit 210 where it operates as a pass through to disk platter 278 when requested data is not available in the solid state memory or when the solid state memory does not have sufficient storage to hold a newly written data set. Based upon the disclosure provided herein, one of ordinary skill in the art will recognize a variety of storage systems including both disk platter 278 and a solid state memory.

Figure 3B:
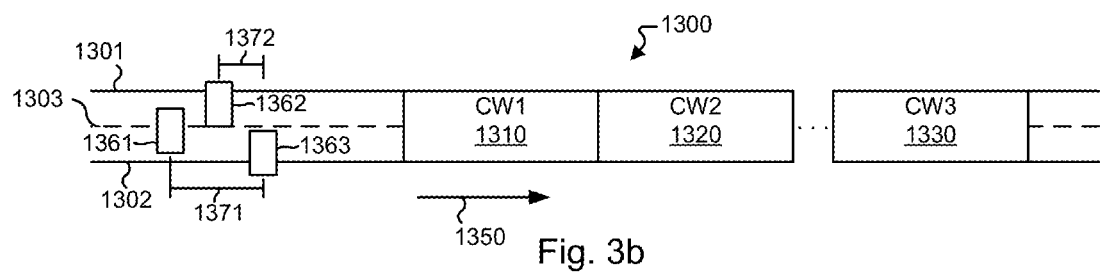
FIG. 3b is a graphical depiction of a three sensor read/write head disposed in relation to a track on a storage medium where the track stores a series of codewords.
Figure 3A:
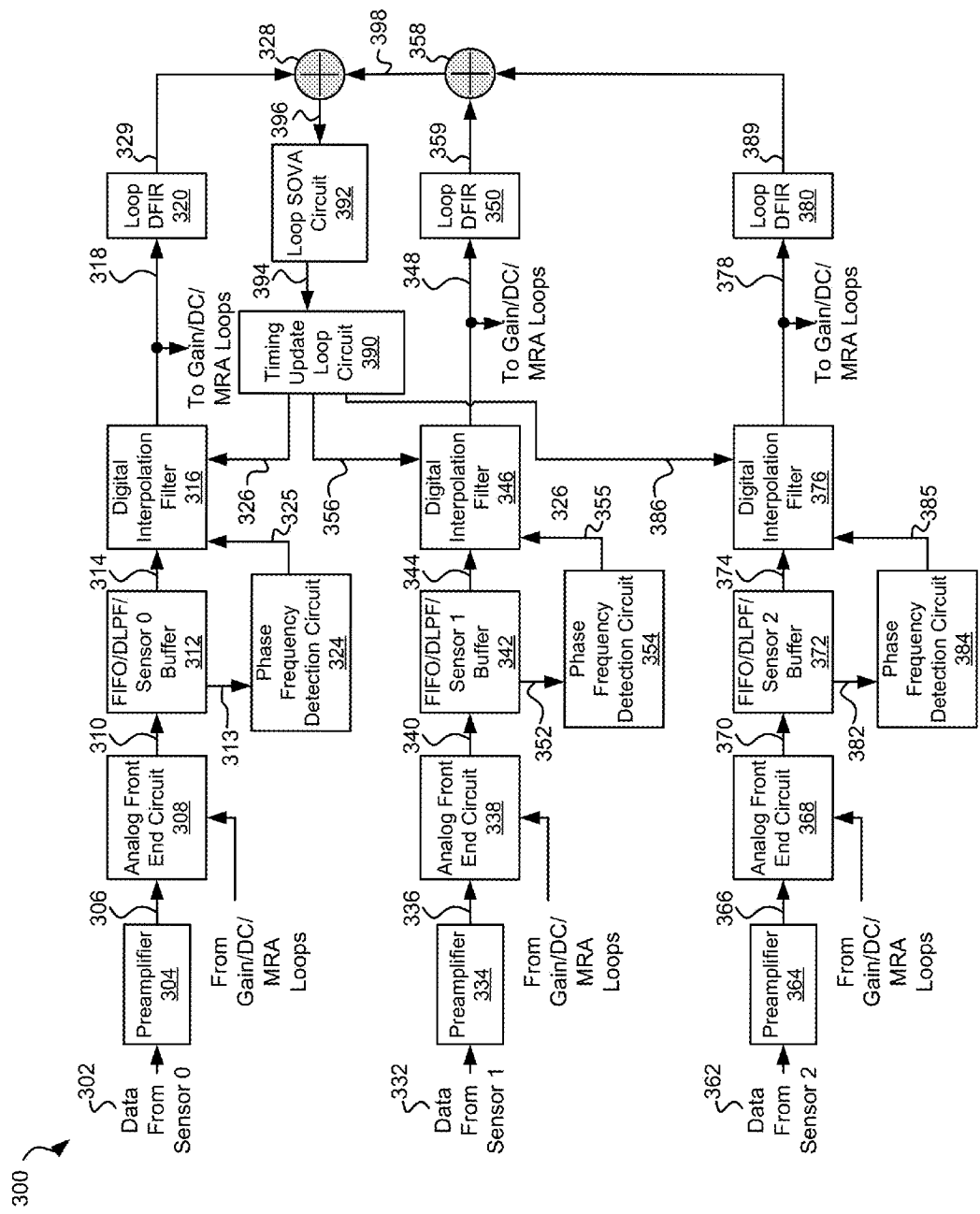
FIG. 3a is a block diagram of a three head circuit including three preamplifier circuits each receiving data from a respective sensor of a three sensor read/write head, and three stream processing circuitry in accordance with some embodiments of the present invention.

Turning to FIG. 3a, a block diagram of a three head circuit 300 including three preamplifier circuits each receiving data from a respective sensor of a three sensor read/write head, and three stream processing circuitry in shown accordance with some embodiments of the present invention. Three head circuit 300 includes a preamplifier circuit 304 that receives data 302 from one sensor of three sensor read/write head (not shown). Data 302 is received as an analog signal derived from sensing information from a track on the storage medium (not shown). Preamplifier circuit 304 amplifies data 302 to yield an amplified signal 306 that is provided to an analog front end circuit 308. Analog front end circuit 308 processes amplified signal 306 to yield a series of digital samples 310. Analog front end circuit 308 may include, but is not limited to, an analog filter, a variable gain amplifier circuit in part governed by a gain input from gain, DC offset, and magneto resistive asymmetry (MRA) modification circuitry (not shown), a DC offset adjustment in part governed by the gain, DC offset, and magneto resistive asymmetry (MRA) modification circuitry, and magneto resistive asymmetry mitigation in part governed by a gain input from gain, DC offset, and magneto resistive asymmetry (MRA) modification circuitry, and an analog to digital converter circuit as are known in the art. Based upon the disclosure provided herein, one of ordinary skill in the art will recognize a variety of circuitry that may be included as part of analog front end circuit 308.

Digital samples 310 are provided to a filter and buffer circuit 312 that applies digital low pass filtering to digital samples 310 and stores the filtered data to a memory buffer. As digital samples are received, a first in first out (FIFO) receives the samples. An offset into the FIFO accounts the physical offsets between sensors on three sensor read/write head. Turning to FIG. 3b, a graphical depiction 1300 shows a single track of a storage medium extending between a track boundary 1301, another track boundary 1302, and a center track 1303. The three read sensors 1361, 1362, 1363 of the three sensor read/write head are disposed over the track with read sensor 1361 disposed near center track 1303 and behind read sensors 1362, 1363 that are respectively disposed near track boundaries 1301, 1302 as the three sensor read/write head moves over the track in a track direction 1350. Read sensor 1361 lags read sensor 1363 by a distance 1371, and read sensor 1362 lags read sensor 1363 by a distance 1372. As three sensor read/write head flies over the track, codewords (i.e., CW1 1310, CW2 1320, CW3 1330) are sensed in serial. As an example, data from sensor 0 302 may be derived from read sensor 1361, data from sensor 1 332 may be derived from read sensor 1362, and data from sensor 2 362 may be derived from read sensor 1363. Returning to FIG. 3a, the offsets into the FIFO of filter and buffer circuit 312 compensates for the lead and lag of the particular read head from which data is being received and the other two read sensors of three sensor read/write head.

Digital samples are accessed from the memory buffer as filtered data 313 by a phase/frequency detection circuit 324. Upon receiving a complete preamble for a given user data set (e.g., preamble 91 of FIG. 1), phase frequency detection circuit 324 calculates a phase adjustment 325 which is to be applied to all user data maintained in the memory buffer of filter and buffer circuit 312 by a digital interpolation filter 316. Phase adjustment 325 is calculated to align the received data with a better sample point which makes the retrieved data more easily discerned by a downstream data decoder circuit. The phase adjustment is calculated differently depending upon whether the processing is in acquisition mode (i.e., the processing of header data associated with a user data set) or tracking mode (i.e., the processing of user data in the data set that follows the header data). One implementation of phase frequency detection circuit 324 circuit is set forth below in relation to FIGS. 3c-3d.

As data is pulled from the FIFO of filter and buffer circuit 312 the digital samples are filtered and stored to a memory buffer as filtered data 314. A digital interpolation filter 316 interpolates filtered data 314 to correct any phase offset errors identified during tracking mode. The interpolation is done based upon a timing feedback 326 from a timing update loop circuit 390 which utilizes feedback based upon all of the sensors from the three sensor read/write head to identify an adjustment for each of the data streams from the respective sensors. The resulting aligned data 318 is provided to gain, DC offset, and magneto resistive asymmetry (MRA) modification circuitry (not shown). This modification circuitry is operable to modify a DC offset, variable gain, and magneto resistive asymmetry mitigation applied by analog front end circuit 308. Any gain, DC offset, and magneto resistive asymmetry (MRA) modification circuitry known in the art may be used in relation to different embodiments of the present invention.

Aligned data 318 is provided to a loop digital finite impulse response filter circuit 320 that is operable to equalize aligned data 318 to yield an equalized output 329. Equalized output 329 is provided to a combining circuit including a summation circuit 328 and a summation circuit 358 to yield a combined feedback 396 from which timing update loop circuit 390 generates timing feedback 326.

Additionally, three head circuit 300 includes a preamplifier circuit 334 that receives data 332 from another sensor of three sensor read/write head. Data 332 is received as an analog signal derived from sensing information from a track on the storage medium. Preamplifier circuit 334 amplifies data 332 to yield an amplified signal 336 that is provided to an analog front end circuit 338. Analog front end circuit 338 processes amplified signal 336 to yield a series of digital samples 340.

Analog front end circuit 338 may include, but is not limited to, an analog filter, a variable gain amplifier circuit in part governed by a gain input from gain, DC offset, and magneto resistive asymmetry (MRA) modification circuitry.

Digital samples 340 are provided to a filter and buffer circuit 342 that applies digital low pass filtering to digital samples 340 and stores the filtered data to a memory buffer. As digital samples are received, a first in first out (FIFO) receives the samples. An offset into the FIFO accounts the physical offsets between sensors on three sensor read/write head. As data is pulled from the FIFO of filter and buffer circuit 342 the digital samples are filtered and stored to a memory buffer as filtered data 344.

Digital samples are accessed from the memory buffer as filtered data 352 by a phase/frequency detection circuit 354. Upon receiving a complete preamble for a given user data set (e.g., preamble 91 of FIG. 1), phase frequency detection circuit 354 calculates a phase adjustment 355 which is to be applied to all user data maintained in the memory buffer of filter and buffer circuit 342 by a digital interpolation filter 346. Phase adjustment 355 is calculated to align the received data with a better sample point which makes the retrieved data more easily discerned by a downstream data decoder circuit. The phase adjustment is calculated differently depending upon whether the processing is in acquisition mode (i.e., the processing of header data associated with a user data set) or tracking mode (i.e., the processing of user data in the data set that follows the header data). One implementation of phase frequency detection circuit 354 circuit is set forth below in relation to FIGS. 3c-3d.

The filtered data is also accessed from filter and buffer circuit 342 as filtered data 344. A digital interpolation filter 346 interpolates filtered data 344 to correct any phase offset errors identified during tracking mode. The interpolation is done based upon a timing feedback 356 from a timing update loop circuit 390 which utilizes feedback based upon all of the sensors from the three sensor read/write head to identify an adjustment for each of the data streams from the respective sensors. The resulting aligned data 348 is provided to gain, DC offset, and magneto resistive asymmetry (MRA) modification circuitry (not shown). This modification circuitry is operable to modify a DC offset, variable gain, and magneto resistive asymmetry mitigation applied by analog front end circuit 338. Any gain, DC offset, and magneto resistive asymmetry (MRA) modification circuitry known in the art may be used in relation to different embodiments of the present invention.

Aligned data 348 is provided to a loop digital finite impulse response filter circuit 350 that is operable to equalize aligned data 348 to yield an equalized output 359. Equalized output 359 is provided to a combining circuit including summation circuit 328 and summation circuit 358 to yield combined feedback 396 from which timing update loop circuit 390 generates timing feedback 356.

Yet further, three head circuit 300 includes a preamplifier circuit 364 that receives data 362 from another sensor of three sensor read/write head. Data 362 is received as an analog signal derived from sensing information from a track on the storage medium. Preamplifier circuit 364 amplifies data 362 to yield an amplified signal 366 that is provided to an analog front end circuit 368. Analog front end circuit 368 processes amplified signal 366 to yield a series of digital samples 370. Analog front end circuit 368 may include, but is not limited to, an analog filter, a variable gain amplifier circuit in part governed by a gain input from gain, DC offset, and magneto resistive asymmetry (MRA) modification circuitry.

Digital samples 370 are provided to a filter and buffer circuit 372 that applies digital low pass filtering to digital samples 370 and stores the filtered data to a memory buffer. As digital samples are received, a first in first out (FIFO) receives the samples. An offset into the FIFO accounts the physical offsets between sensors on three sensor read/write head. As data is pulled from the FIFO of filter and buffer circuit 372 the digital samples are filtered and stored to a memory buffer as filtered data 374.

Digital samples are accessed from the memory buffer as filtered data 382 by a phase/frequency detection circuit 384. Upon receiving a complete preamble for a given user data set (e.g., preamble 91 of FIG. 1), phase frequency detection circuit 384 calculates a phase adjustment 385 which is to be applied to all user data maintained in the memory buffer of filter and buffer circuit 372 by a digital interpolation filter 376. Phase adjustment 385 is calculated to align the received data with a better sample point which makes the retrieved data more easily discerned by a downstream data decoder circuit. The phase adjustment is calculated differently depending upon whether the processing is in acquisition mode (i.e., the processing of header data associated with a user data set) or tracking mode (i.e., the processing of user data in the data set that follows the header data). One implementation of phase frequency detection circuit 384 circuit is set forth below in relation to FIGS. 3c-3d.

The filtered data is also accessed from filter and buffer circuit 372 as filtered data 374. A digital interpolation filter 376 interpolates filtered data 374 to correct any phase offset errors identified during tracking mode. The interpolation is done based upon a timing feedback 386 from a timing update loop circuit 390 which utilizes feedback based upon all of the sensors from the three sensor read/write head to identify an adjustment for each of the data streams from the respective sensors. The resulting aligned data 378 is provided to gain, DC offset, and magneto resistive asymmetry (MRA) modification circuitry (not shown).

Aligned data 378 is provided to a loop digital finite impulse response filter circuit 380 that is operable to equalize aligned data 378 to yield an equalized output 389. Equalized output 389 is provided to a combining circuit including summation circuit 328 and summation circuit 358 to yield combined feedback 396 from which timing update loop circuit 390 generates timing feedback 386.

Combined feedback 396 is provided to a loop soft output Viterbi algorithm (SOVA) circuit 392 that applies a SOVA algorithm to yield a decision output 394. Decision output 394 is provided to timing update loop circuit 390 that modifies one or more of timing feedback 326, timing feedback 356 and/or timing feedback 386. In contrast to phase frequency detection circuits 324, 354, 384 that operate to modify phases during acquisition mode, timing update loop 390 operates to adjust phase during tracking mode. In some embodiments of the present invention, timing feedback 326, timing feedback 356, and timing feedback 386 are the same signal distributed to all of digital interpolation filter 316, digital interpolation filter 346, and digital interpolation filter 376.

Figure 3C:
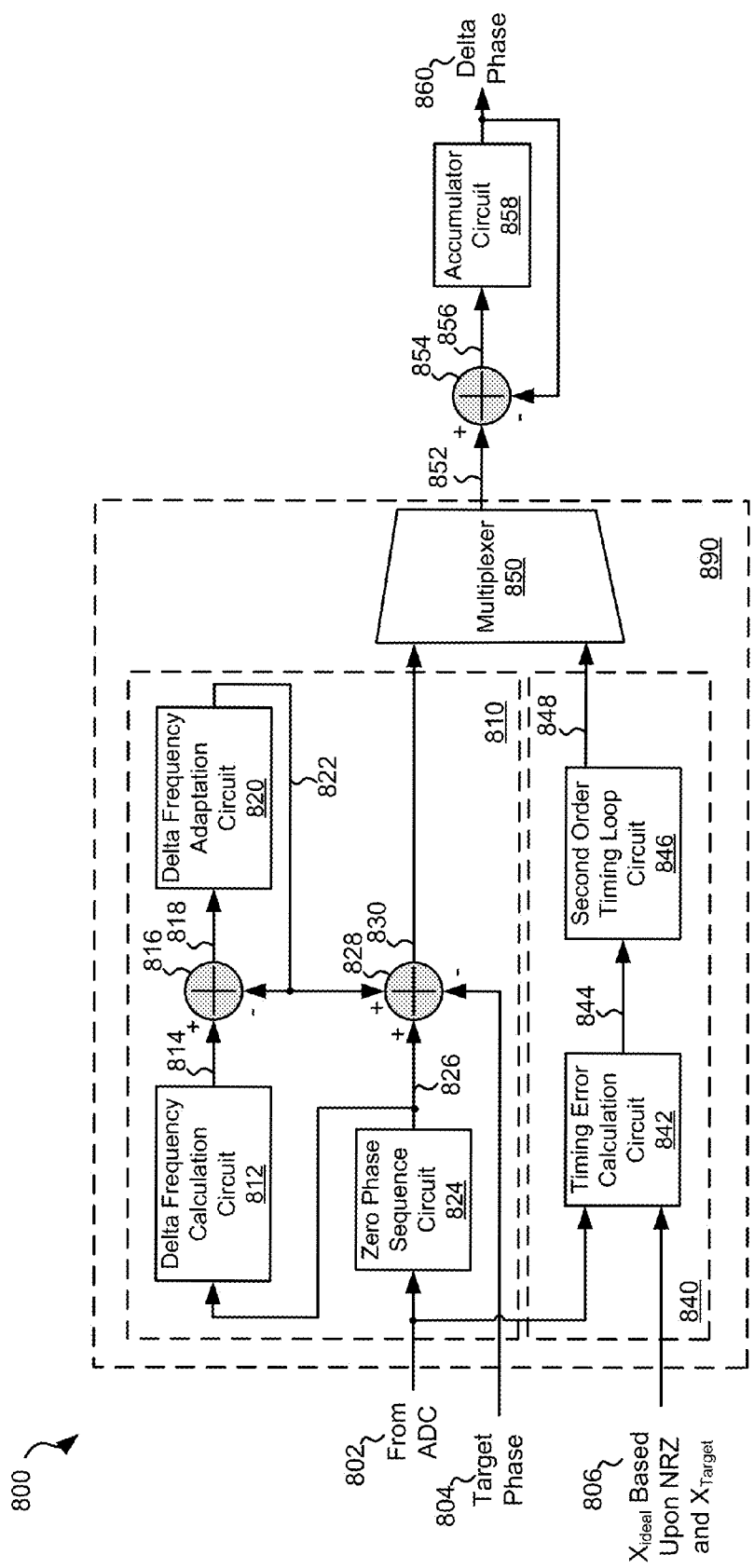
FIG. 3c is a block diagram of a phase adjustment circuit that may be used to phase adjust data from one sensor in accordance with some embodiments of the present invention.

Turning to FIG. 3c, a block diagram of a phase adjustment circuit 800 that may be used to phase adjust data from one sensor is shown in accordance with some embodiments of the present invention. For example, where phase adjustment circuit 800 is used an acquisition portion 810 (outlined by dashed lines) is replicated three times to replace phase frequency detection circuit 324, phase frequency detection circuit 354, and phase frequency detection circuit 384. A tracking 840 (outlined by dashed lines) replaces timing loop circuit 390. The remainder of the circuit including a multiplexer 850, a summation circuit 854 and an accumulator circuit are replicated three times with each respective portion being implemented as part of digital interpolation filter 316, digital interpolation filter 346, and digital interpolation filter 376, respectively.

Acquisition portion 810 includes a zero phase sequence circuit (ZPS) 824 that calculate the zero phase sequence of a series of digital samples to yield a ZPS output 826. The series of digital samples may be derived from an ADC 802 (e.g., the ADC implemented as part of one of any of analog front end circuit 308, analog front end circuit 338, or analog front end circuit 368). ZPS 824 may be any ZPS circuit known in the art.

ZPS output 826 is provided to both a delta frequency calculation circuit 812 and a summation circuit 828. Delta frequency calculation circuit 812 calculates a frequency change based upon ZPS output 826 to yield a delta frequency output 814 to a summation circuit 816. Summation circuit 816 subtracts an accumulated frequency 822 from delta frequency output 814 to yield an updated delta frequency 818. Updated delta frequency 818 is provided to a delta frequency adaptation circuit 820 that calculates accumulated frequency 822 over a period in accordance with the following equation:

Accumulated Frequency822=Σupdated delta frequency818=ε$\Delta fT$.

Summation circuit 828 subtracts a target phase 804 from the sum of both an accumulated frequency offset 822 and ZPS output 826 to yield a sum 830 in accordance with the following equation:

Sum830=Σ$\Delta fT$+ZPS Output826−Target Phase804.

Target phase 804 may be generated by convolving a target with a loop path estimation (LPE) value as is known in the art. Sum 830 is provided to a multiplexer 850 where it is selected as a phase adjustment output 852 whenever acquisition mode is ongoing.

Tracking portion 840 includes a timing error calculation circuit that operates to determine a timing error between the actual data from ADC 804, and ideal data 804 corresponding to the actual data from ADC 804. The ideal data may be generated by convolving NRZ data with a target as is known in the art. Timing error calculation circuit 842 provides a timing error output 844 that is processed by a second order timing loop circuit 846 to yield a phase adjustment output 848. Phase adjustment output 848 is provided to multiplexer 850 where it is selected as a phase adjustment output 852 whenever tracking mode is ongoing. As shown in dashed lines, multiplexer 850 is included with tracking portion 840 and acquisition portion 810 in a circuit block 890.

Phase adjustment output 852 is provided to a summation circuit 854 where it is subtracted from a delta phase output 860 to yield a sum 856. Sum 856 is stored in an accumulator circuit 858 that provides delta phase output 860. Delta phase output 860 is provided to a digital interpolation filter modifying the phase of a data set derived from one of the sensors of the three sensor read/write head to which phase adjustment circuit 800 corresponds. Such an approach does not require the use of a traditional timing loop, but rather allows for calculating the different between the input signal and the target signal in every stream followed by digital interpolation to move the data close to the target signal.

Figure 3D:
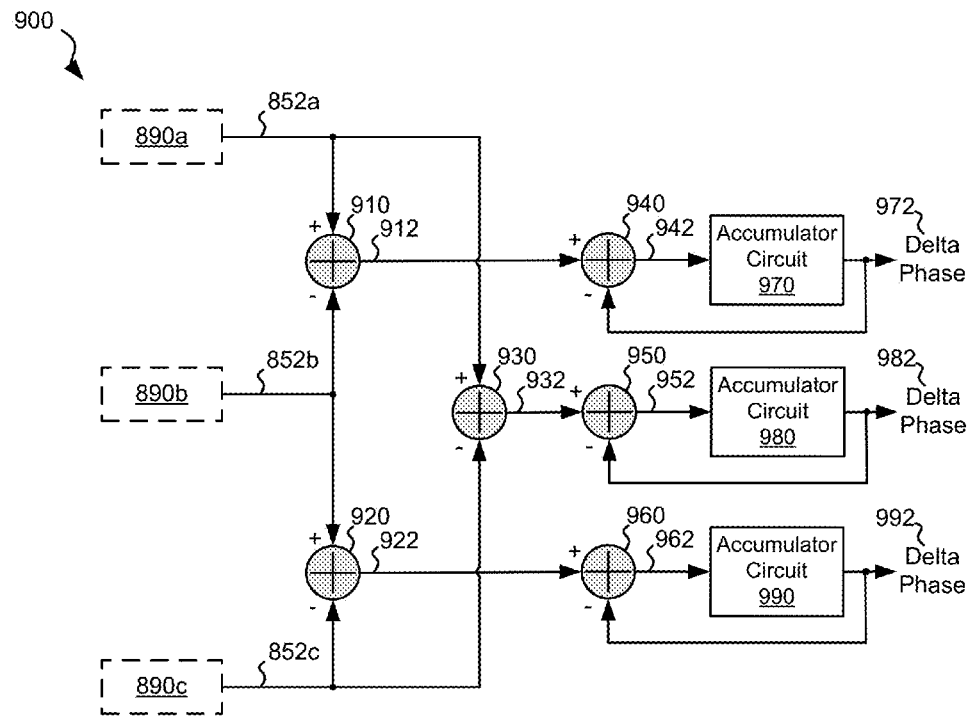
FIG. 3d is a block diagram of a combination of three phase adjustment circuits that may be used to adjust the phase of data from all three sensors in accordance with one or more embodiments of the present invention.

Turning to FIG. 3d, a block diagram of a combination of three phase adjustment circuits 900 that may be used to adjust the phase of data from all three sensors is shown in accordance with one or more embodiments of the present invention. Three phase adjustment circuits 900 includes three instances of circuit block 890 described above in relation to FIG. 3c to perform both acquisition mode and tracking mode alignment between three data steams derived from respective read sensors. A first instance 890a providing a phase adjustment output 852a that drives a phase adjustment governing phase alignment by a digital interpolation filter interpolating the data from a first sensor of the three sensor read/write head, a second instance 890b providing a phase adjustment output 852b that drives a phase adjustment governing phase alignment by a digital interpolation filter interpolating the data from a second sensor of the three sensor read/write head, and a third instance 890c providing a phase adjustment output 852c that drives a phase adjustment governing phase alignment by a digital interpolation filter interpolating the data from a third sensor of the three sensor read/write head.

Phase adjustment output 852a and phase adjustment output 852b are provided to a summation circuit 910 that subtracts phase adjustment output 852b from phase adjustment output 852a to yield a sum 912. Phase adjustment output 852b and phase adjustment output 852c are provided to a summation circuit 920 that subtracts phase adjustment output 852c from phase adjustment output 852b to yield a sum 922. Phase adjustment output 852a and phase adjustment output 852c are provided to a summation circuit 930 that subtracts phase adjustment output 852c from phase adjustment output 852a to yield a sum 932.

Sum 912 is provided to a summation circuit 940 where it is subtracted from a delta phase output 972 to yield a sum 942. Sum 942 is stored in an accumulator circuit 970 that provides delta phase output 972. Delta phase output 972 is provided to a digital interpolation filter modifying the phase of a data set derived from the first sensor of the three sensor read/write head. Sum 922 is provided to a summation circuit 960 where it is subtracted from a delta phase output 992 to yield a sum 962. Sum 962 is stored in an accumulator circuit 990 that provides delta phase output 992. Delta phase output 992 is provided to a digital interpolation filter modifying the phase of a data set derived from the third sensor of the three sensor read/write head. Sum 932 is provided to a summation circuit 950 where it is subtracted from a delta phase output 982 to yield a sum 952. Sum 952 is stored in an accumulator circuit 980 that provides delta phase output 982. Delta phase output 982 is provided to a digital interpolation filter modifying the phase of a data set derived from the second sensor of the three sensor read/write head.

Referring again to FIG. 3a, in operation data is received by three head circuit 300 in parallel from three sensors of a three sensor read/write head. The data received from each of the sensors may be a minute analog signal that is amplified to yield amplified signals corresponding to each of the respective sensors. A variety of processing is applied to each of the amplifies signals to yield corresponding digital samples. Such processing may include, but is not limited to, analog filtering, variable gain amplification circuit in part governed by a gain input from gain, DC offset, and magneto resistive asymmetry (MRA) modification circuitry (not shown), DC offset adjustment in part governed by the gain, DC offset, and magneto resistive asymmetry (MRA) modification circuitry, and magneto resistive asymmetry mitigation in part governed by a gain input from gain, DC offset, and magneto resistive asymmetry (MRA) modification circuitry, and analog to digital conversion to yield the series of digital samples corresponding to the streams from the respective read sensors of three sensor read/write head.

The resulting digital samples are stored in respective memory buffers from where they are accessed by digital interpolator circuits. A digital interpolator circuit is used for each of the sensors of the three sensor read/write head. The three digital interpolator circuits are governed by timing feedback directing alignment of the buffered data from the respective sensors of the three sensor read/write head. During acquisition mode (i.e., the processing of header data associated with a user data set), the timing feedback may be generated using a circuit similar to that discussed above as acquisition portion 810 discussed above in relation to FIG. 3*c*. In addition, a FIFO is used during this acquisition mode to perform an alignment of signals from each of the sensors from the three sensor read/write head. During tracking mode (i.e., the processing of user data in the data set that follows the header data), the timing feedback may be generated using a circuit similar to that discussed above as tracking portion 840 discussed above in relation to FIG. 3*c*.

A digital interpolation is applied to the samples derived from each of the sensors of three sensor read/write head. This digital interpolation modifies the phase of the samples associated with the respective sensor of the three sensor read/write head. Application of the digital interpolation yields an interpolated output. The interpolated output derived from each of the sample sets derived from the respective sensors of the three sensor read/write head is equalized using a digital finite impulse response filter circuit to yield an equalized output. The equalized outputs corresponding to respective sensors are summed to yield a combined feedback. A soft output Viterbi detection algorithm is applied to the combined feedback to yield a decision output. This decision output is provided to a timing loop during the tracking mode to yield an updated phase shift to be applied by the respective digital interpolation circuits to modify the phase of each of the respective streams of data derived from the sensors of the three sensor read/write head assembly. In some cases, this decision output is used to generate the $X_{ideal}$ input to tracking portion 840 discussed above in relation to FIG. 3*c*.

Figure 4:
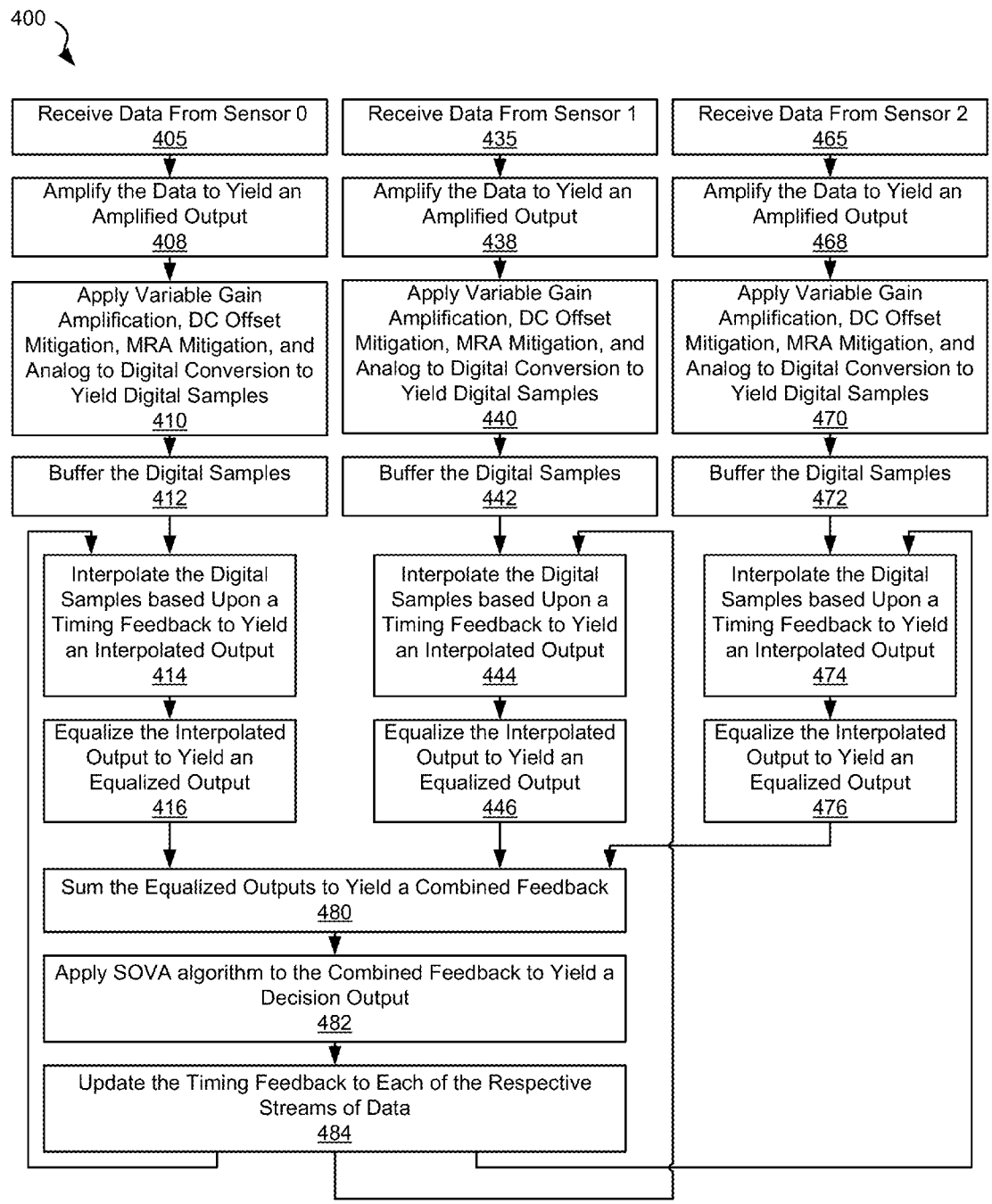
FIG. 4 is a flow diagram showing a method in accordance with one or more embodiments of the present invention for accessing data from a single track using a three sensor read head.

Turning to FIG. 4, a flow diagram 400 shows a method in accordance with one or more embodiments of the present invention for accessing data from a single track using a three sensor read head. Following flow diagram 400, data is received by a first sensor of three sensor read/write head (block 405) in parallel to receiving data from a second sensor of three sensor read/write head (block 435) and from a third sensor of three sensor read/write head (block 465). The data received from each of the sensors may be a respective minute analog signal. The signal from the first sensor is amplified to yield an amplified output (block 408) in parallel with amplifying the signal from the second sensor to yield an amplified output (block 438) and amplifying the signal from the third sensor to yield an amplified output (block 468). The amplified signals derived from each of the sensors are then processed to apply a variable gain amplification, a DC offset mitigation, an MRA mitigation, and an analog to digital conversion (blocks 410, 440, 470) resulting in respective series of digital samples. The resulting series of digital samples are stored to respective buffers (block 412, 442, 472). These samples are provided to the respective buffers via a FIFO having an offset that accounts for the distance between the respective read sensors of three sensor read/write head. Thus, the samples in the respective buffers are substantially aligned with each other.

The FIFO aligned samples are accessed from the buffers and interpolated using respective digital interpolator circuits to yield corresponding interpolated outputs (blocks 414, 444, 474). The digital interpolator circuits are governed by a timing feedback directing alignment of the buffered data from the respective sensors of the three sensor read/write head. During acquisition mode (i.e., the processing of header data associated with a user data set), the timing feedback may be generated using a circuit similar to that discussed above as acquisition portion 810 discussed above in relation to FIG. 3*c*. During tracking mode (i.e., the processing of user data in the data set that follows the header data), the timing feedback may be generated using a circuit similar to that discussed above as tracking portion 840 discussed above in relation to FIG. 3*c*. Using the timing feedback signals, the respective digital interpolation circuits modify the phase of the samples associated with the respective sensor of the three sensor read/write head. The interpolated output derived from each of the sample sets derived from the respective sensors of the three sensor read/write head is equalized using a digital finite impulse response filter circuit to yield an equalized output (blocks 416, 446, 476).

The equalized outputs corresponding to respective sensors are summed to yield a combined feedback (block 480). A soft output Viterbi detection algorithm is applied to the combined feedback to yield a decision output (block 482). This decision output is provided to a timing loop during the tracking mode to yield an updated phase shift to be applied by the respective digital interpolation circuits to modify the phase of each of the respective streams of data derived from the sensors of the three sensor read/write head assembly (block 484). In some cases, this decision output is used to generate the $X_{ideal}$ input to tracking portion 840 discussed above in relation to FIG. 3*c*.

Figure 5D:
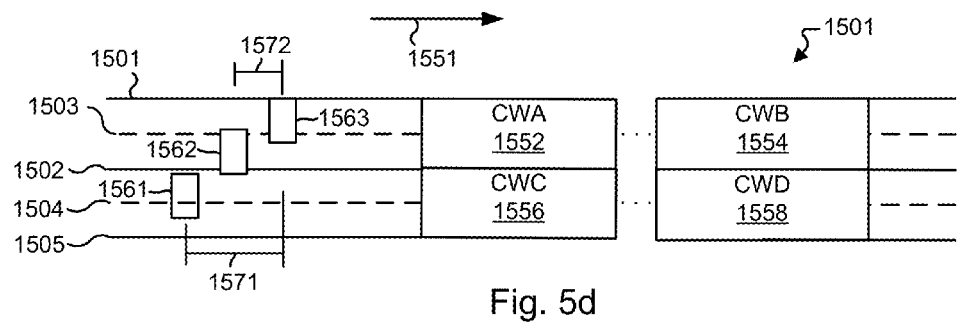
FIG. 5d is a graphical depiction of a three sensor read/write head disposed in relation to a track on a storage medium where the track stores a series of codewords in serial.
Figure 5A:
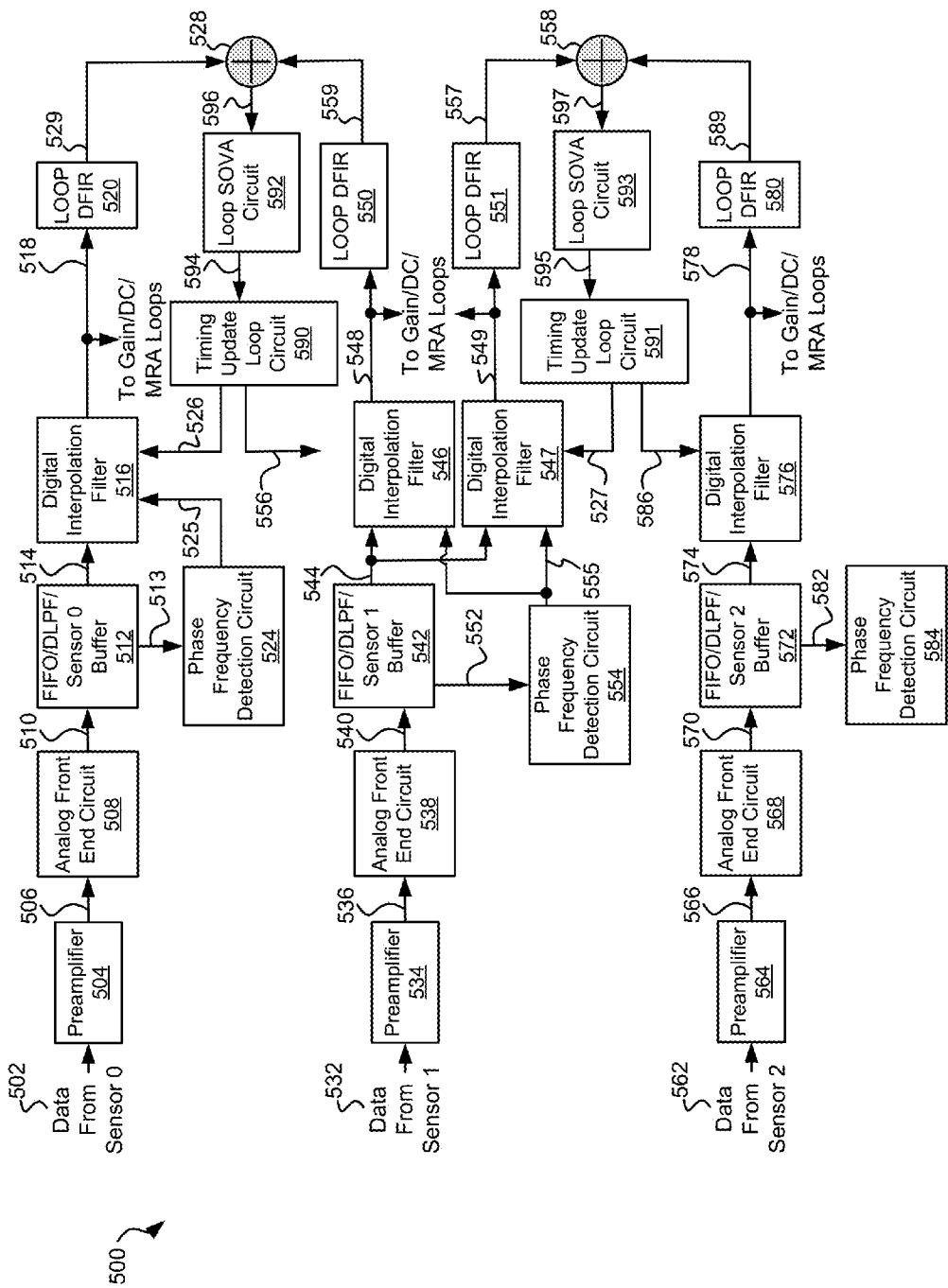
FIG. 5a is a block diagram of a three head circuit including three preamplifier circuits each receiving data from a respective sensor of a three sensor read/write head, and three stream processing circuitry in accordance with some embodiments of the present invention.

Turning to FIG. 5*a*, a block diagram of a three head circuit 500 including three preamplifier circuits each receiving data from a respective sensor of a three sensor read/write head, and three stream processing circuitry is shown in accordance with some embodiments of the present invention. Three head circuit 500 includes a preamplifier circuit 504 that receives data 502 from one sensor of three sensor read/write head (not shown). Data 502 is received as an analog signal derived from sensing information from a track on the storage medium (not shown). Preamplifier circuit 504 amplifies data 502 to yield an amplified signal 506 that is provided to an analog front end circuit 508. Analog front end circuit 508 processes amplified signal 506 to yield a series of digital samples 510. Analog front end circuit 508 may include, but is not limited to, an analog filter, a variable gain amplifier circuit in part governed by a gain input from gain, DC offset, and magneto resistive asymmetry (MRA) modification circuitry (not shown), a DC offset adjustment in part governed by the gain, DC offset, and magneto resistive asymmetry (MRA) modification circuitry, and magneto resistive asymmetry mitigation in part governed by a gain input from gain, DC offset, and magneto resistive asymmetry (MRA) modification circuitry, and an analog to digital converter circuit as are known in the art. Based upon the disclosure provided herein, one of ordinary skill in the art will recognize a variety of circuitry that may be included as part of analog front end circuit 508.

Figure 5B:
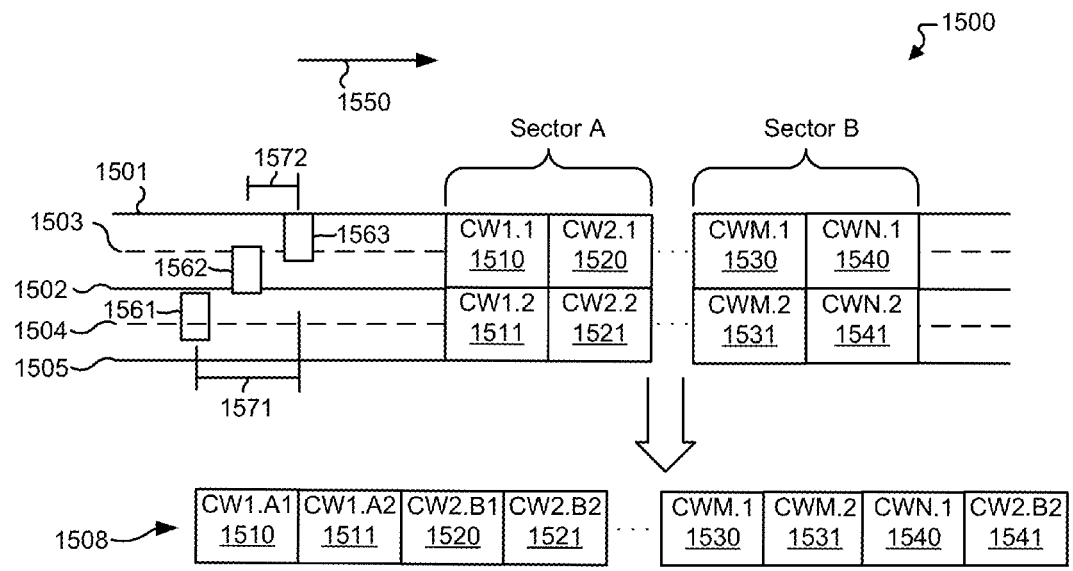
FIG. 5b is a graphical depiction of a three sensor read/write head disposed in relation to a track on a storage medium where the track stores a series of codewords in parallel.

Digital samples 510 are provided to a filter and buffer circuit 512 that applies digital low pass filtering to digital samples 510 and stores the filtered data to a memory buffer. As digital samples are received, a first in first out (FIFO) receives the samples. An offset into the FIFO accounts the physical offsets between sensors on three sensor read/write head. Turning to FIG. 5*b*, a graphical depiction 1500 shows one example of a three sensor read/write head disposed in relation to two adjacent tracks on a storage medium where the tracks store a series of codewords in parallel. One of the two adjacent tracks extends between a track boundary 1501 and another track boundary 1502 and includes a center track 1503. Another of the two adjacent tracks extends between a track boundary 1502 and another track boundary 1505 and includes a center track 1504. The three read sensors 1561,

1562, 1563 of the three sensor read/write head are disposed over the tracks with read sensor 1561 disposed primarily over the track defined between track boundary 1502 and track boundary 1505, read sensor 1562 disposed partially over both tracks, and read sensor 1563 disposed primarily over the track defined between track boundary 1502 and track boundary 1501. Read sensor 1561 lags read sensor 1563 by a distance 1571, and read sensor 1562 lags read sensor 1563 by a distance 1572. As used herein, the term "codeword" denotes a data set including user data and encoding data that are processed as a package using a data decoding circuit. As three sensor read/write head flies over both tracks in a direction 1550 serially sensing elements of separate portions stored to different tracks in parallel the track. In particular, as the read/write head flies over the two tracks, sensor 1563 serially senses a portion of a first codeword (e.g., CW1.1 1510) in parallel to sensor 1561 serially sensing another portion of the same first codeword (e.g., CW1.2 1511); sensor 1563 serially senses a portion of a second codeword (e.g., CW2.1 1520) in parallel to sensor 1561 serially sensing another portion of the same second codeword (e.g., CW2.2 1521); sensor 1563 serially senses a portion of a third codeword (e.g., CW3.1 1530) in parallel to sensor 1561 serially sensing another portion of the same third codeword (e.g., CW3.2 1511); and sensor 1563 serially senses a portion of a third codeword (e.g., CW4.1 1540) in parallel to sensor 1561 serially sensing another portion of the same third codeword (e.g., CW4.2 1541). As sensor 1562 is partially disposed over both tracks and as such senses a combination of what is stored to both tracks. The parallel data portions are then re-assembled as shown in a re-assembled data pattern 1508 such that the codewords are a serial data set. As shown, re-assembled data pattern 1508 includes CW1.1 1510 followed by CW1.2 1511, CW2.1 1520 followed by CW2.2 1521, CW3.1 1530 followed by CW3.2 1531, and CW4.1 1540 followed by CW4.2 1541. Turning to FIG. 5d, a graphical depiction 1501 shows an example of a three sensor read/write head disposed in relation to two adjacent tracks on a storage medium where the tracks store a series of codewords in serial. The same track structure used in FIG. 5b is used in this example with the difference being that the individual codewords are not spread across tracks, but rather each codeword is included on the same track. As three sensor read/write head flies over both tracks in a direction 1551 serially sensing elements of separate portions stored to different tracks in serial. In particular, as the read/write head flies over the two tracks, sensor 1563 serially senses codewords A and B (i.e., CWA 1552 and CWB 1554), and sensor 1561 serially senses codewords C and D (i.e., CWC 1556 and CWD 1558). As sensor 1562 is partially disposed over both tracks and as such senses a combination of what is stored to both tracks.

Returning to FIG. 5a, the offsets into the FIFO of filter and buffer circuit 512 compensates for the lead and lag of the particular read head from which data is being received and the other two read sensors of three sensor read/write head. Digital samples are accessed from the memory buffer as filtered data 513 by a phase/frequency detection circuit 524. Upon receiving a complete preamble for a given user data set (e.g., preamble 91 of FIG. 1), phase frequency detection circuit 524 calculates a phase adjustment 525 which is to be applied to all user data maintained in the memory buffer of filter and buffer circuit 512 by a digital interpolation filter 516. Phase adjustment 525 is calculated to align the received data with a better sample point which makes the retrieved data more easily discerned by a downstream data decoder circuit. The phase adjustment is calculated differently depending upon whether the processing is in acquisition mode (i.e., the processing of header data associated with a user data set) or tracking mode (i.e., the processing of user data in the data set that follows the header data). Phase frequency detection circuit 524 circuit may be implemented similarly to that set forth above in relation to FIG. 3c.

As data is pulled from the FIFO of filter and buffer circuit 512 the digital samples are filtered and stored to a memory buffer as filtered data 514. A digital interpolation filter 516 interpolates filtered data 514 to correct any phase offset errors identified during tracking mode. The interpolation is done based upon a timing feedback 526 from a timing update loop circuit 590 which utilizes feedback based upon two of the sensors (i.e., sensor 0 and sensor 1) from the three sensor read/write head to identify an adjustment for each of the data streams from the respective sensors. The resulting aligned data 518 is provided to gain, DC offset, and magneto resistive asymmetry (MRA) modification circuitry (not shown). This modification circuitry is operable to modify a DC offset, variable gain, and magneto resistive asymmetry mitigation applied by analog front end circuit 508. Any gain, DC offset, and magneto resistive asymmetry (MRA) modification circuitry known in the art may be used in relation to different embodiments of the present invention.

Aligned data 518 is provided to a loop digital finite impulse response filter circuit 520 that is operable to equalize aligned data 518 to yield an equalized output 529. Equalized output 529 is provided to a combining circuit including a summation circuit 528 to yield a combined feedback 596 from which timing update loop circuit 590 generates timing feedback 526.

Additionally, three head circuit 500 includes a preamplifier circuit 534 that receives data 532 from another sensor of three sensor read/write head. Data 532 is received as an analog signal derived from sensing information from a track on the storage medium. Preamplifier circuit 534 amplifies data 532 to yield an amplified signal 536 that is provided to an analog front end circuit 538. Analog front end circuit 538 processes amplified signal 536 to yield a series of digital samples 540. Analog front end circuit 538 may include, but is not limited to, an analog filter, a variable gain amplifier circuit in part governed by a gain input from gain, DC offset, and magneto resistive asymmetry (MRA) modification circuitry.

Digital samples 540 are provided to a filter and buffer circuit 542 that applies digital low pass filtering to digital samples 540 and stores the filtered data to a memory buffer. As digital samples are received, a first in first out (FIFO) receives the samples. An offset into the FIFO accounts the physical offsets between sensors on three sensor read/write head. As data is pulled from the FIFO of filter and buffer circuit 542 the digital samples are filtered and stored to a memory buffer as filtered data 544.

Digital samples are accessed from the memory buffer as filtered data 552 by a phase/frequency detection circuit 554. Upon receiving a complete preamble for a given user data set (e.g., preamble 91 of FIG. 1), phase frequency detection circuit 554 calculates a phase adjustment 555 which is to be applied to all user data maintained in the memory buffer of filter and buffer circuit 542 by a digital interpolation filter 546. Phase adjustment 555 is calculated to align the received data with a better sample point which makes the retrieved data more easily discerned by a downstream data decoder circuit. The phase adjustment is calculated differently depending upon whether the processing is in acquisition mode (i.e., the processing of header data associated with a user data set) or tracking mode (i.e., the processing of user data in the data set that follows the header data). One implementation of phase frequency detection circuit 554 circuit is set forth below in relation to FIG. 3c.

The filtered data is also accessed from filter and buffer circuit 542 as filtered data 544. A digital interpolation filter 546 interpolates filtered data 544 to correct any phase offset errors identified during tracking mode. The interpolation is done based upon a timing feedback 556 from timing update loop circuit 590 which utilizes feedback based upon two of the sensors (i.e., sensor 0 and sensor 1) from the three sensor read/write head to identify an adjustment for each of the data streams from the respective sensors. The resulting aligned data 548 is provided to gain, DC offset, and magneto resistive asymmetry (MRA) modification circuitry (not shown). This modification circuitry is operable to modify a DC offset, variable gain, and magneto resistive asymmetry mitigation applied by analog front end circuit 538. Any gain, DC offset, and magneto resistive asymmetry (MRA) modification circuitry known in the art may be used in relation to different embodiments of the present invention. In parallel, a digital interpolation filter 547 interpolates filtered data 544 to correct any phase offset errors identified during tracking mode. The interpolation is done based upon a timing feedback 527 from a timing update loop circuit 591 which utilizes feedback based upon two of the sensors (sensor 1 and sensor 2) from the three sensor read/write head to identify an adjustment for each of the data streams from the respective sensors. The resulting aligned data 549 is provided to gain, DC offset, and magneto resistive asymmetry (MRA) modification circuitry (not shown). This modification circuitry is operable to modify a DC offset, variable gain, and magneto resistive asymmetry mitigation applied by analog front end circuit 538. Any gain, DC offset, and magneto resistive asymmetry (MRA) modification circuitry known in the art may be used in relation to different embodiments of the present invention Aligned data 549 is provided to a loop digital finite impulse response filter circuit 551 that is operable to equalize aligned data 549 to yield an equalized output 557. Equalized output 557 is provided to a combining circuit including summation circuit 558 to yield combined feedback 595 from which timing update loop circuit 591 generates timing feedback 527.

Yet further, three head circuit 500 includes a preamplifier circuit 564 that receives data 562 from another sensor of three sensor read/write head. Data 562 is received as an analog signal derived from sensing information from a track on the storage medium. Preamplifier circuit 564 amplifies data 562 to yield an amplified signal 566 that is provided to an analog front end circuit 568. Analog front end circuit 568 processes amplified signal 566 to yield a series of digital samples 570. Analog front end circuit 568 may include, but is not limited to, an analog filter, a variable gain amplifier circuit in part governed by a gain input from gain, DC offset, and magneto resistive asymmetry (MRA) modification circuitry.

Digital samples 570 are provided to a filter and buffer circuit 572 that applies digital low pass filtering to digital samples 570 and stores the filtered data to a memory buffer. As digital samples are received, a first in first out (FIFO) receives the samples. An offset into the FIFO accounts the physical offsets between sensors on three sensor read/write head. As data is pulled from the FIFO of filter and buffer circuit 572 the digital samples are filtered and stored to a memory buffer as filtered data 574.

Digital samples are accessed from the memory buffer as filtered data 582 by a phase/frequency detection circuit 584. Upon receiving a complete preamble for a given user data set (e.g., preamble 91 of FIG. 1), phase frequency detection circuit 584 calculates a phase adjustment 585 which is to be applied to all user data maintained in the memory buffer of filter and buffer circuit 572 by a digital interpolation filter 576. Phase adjustment 585 is calculated to align the received data with a better sample point which makes the retrieved data more easily discerned by a downstream data decoder circuit. The phase adjustment is calculated differently depending upon whether the processing is in acquisition mode (i.e., the processing of header data associated with a user data set) or tracking mode (i.e., the processing of user data in the data set that follows the header data). One implementation of phase frequency detection circuit 584 circuit is set forth below in relation to FIG. 3c.

The filtered data is also accessed from filter and buffer circuit 572 as filtered data 574. A digital interpolation filter 576 interpolates filtered data 574 to correct any phase offset errors identified during tracking mode. The interpolation is done based upon a timing feedback 586 from timing update loop circuit 591 which utilizes feedback based upon two of the sensors (i.e., sensor 1 and sensor 2) from the three sensor read/write head to identify an adjustment for each of the data streams from the respective sensors. The resulting aligned data 578 is provided to gain, DC offset, and magneto resistive asymmetry (MRA) modification circuitry (not shown).

Aligned data 578 is provided to a loop digital finite impulse response filter circuit 580 that is operable to equalize aligned data 578 to yield an equalized output 589. Equalized output 589 is provided to a combining circuit including summation circuit 528 and summation circuit 558 to yield combined feedback 596 from which timing update loop circuit 590 generates timing feedback 586.

Combined feedback 596 is provided to a loop soft output Viterbi algorithm (SOVA) circuit 592 that applies a SOVA algorithm to yield a decision output 594. Decision output 594 is provided to timing update loop circuit 590 that modifies one or more of timing feedback 526 and timing feedback 556. In contrast to phase frequency detection circuits 524, 554, 584 that operate to modify phases during acquisition mode, timing update loop 590 operates to adjust phase during tracking mode. In some embodiments of the present invention, timing feedback 526 and timing feedback 556 are the same signal distributed to all of digital interpolation filter 516 and digital interpolation filter 546. Similarly, combined feedback 597 is provided to a loop soft output Viterbi algorithm (SOVA) circuit 593 that applies a SOVA algorithm to yield a decision output 595. Decision output 595 is provided to timing update loop circuit 591 that modifies one or more of timing feedback 527 and timing feedback 586. In contrast to phase frequency detection circuits 524, 554, 584 that operate to modify phases during acquisition mode, timing update loop 591 operates to adjust phase during tracking mode. In some embodiments of the present invention, timing feedback 527 and timing feedback 557 are the same signal distributed to all of digital interpolation filter 547 and digital interpolation filter 576.

Figure 5C:
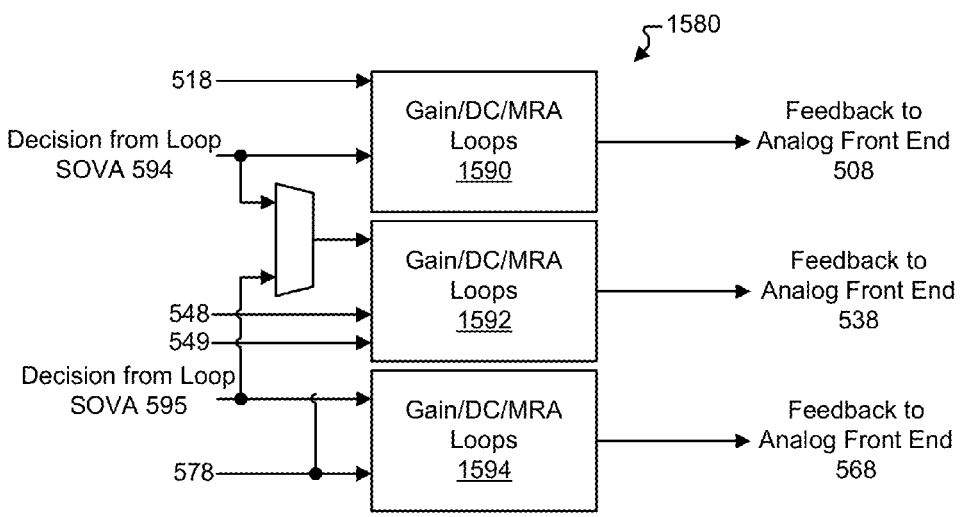

Turning to FIG. 5c, feedback to analog front end circuits via gain, DC offset, and magneto resistive asymmetry (MRA) modification circuitry for three head circuit 500 reading two tracks at a time is show as a loop circuit 1580. Loop circuit 1580 includes three gain, DC offset, and magneto resistive asymmetry (MRA) modification circuits 1590, 1592, 1594 each associated with respective analog front end circuits 508, 538, 568. Gain, DC offset, and magneto resistive asymmetry (MRA) modification circuit 1590 generates gain, DC offset and magneto resistive asymmetry (MRA) modification outputs that are fed back to analog front end circuit 508. The gain, DC offset and magneto resistive asymmetry (MRA) modification outputs are calculated based upon a combination of decision output 594 from Loop SOVA circuit 592 and aligned data 518. Gain, DC offset, and magneto resistive asymmetry (MRA) modification circuit 1592 generates gain, DC offset and magneto resistive asymmetry (MRA) modification outputs that are fed back to analog front end circuit 538 based upon decision output 594 from Loop SOVA circuit 592 and aligned data 548 when read sensor 1 is more over the same track as read sensor 0; and generates gain, DC offset and magneto resistive asymmetry (MRA) modification outputs that are fed back to analog front end circuit 538 based upon decision output 595 from Loop SOVA circuit 593 and aligned data 549 when read sensor 1 is more over the same track as read sensor 2. Gain, DC offset, and magneto resistive asymmetry (MRA) modification circuit 1594 generates gain, DC offset and magneto resistive asymmetry (MRA) modification outputs that are fed back to analog front end circuit 568. The gain, DC offset and magneto resistive asymmetry (MRA) modification outputs are calculated based upon a combination of decision output 595 from Loop SOVA circuit 593 and aligned data 578.

Figure 6:
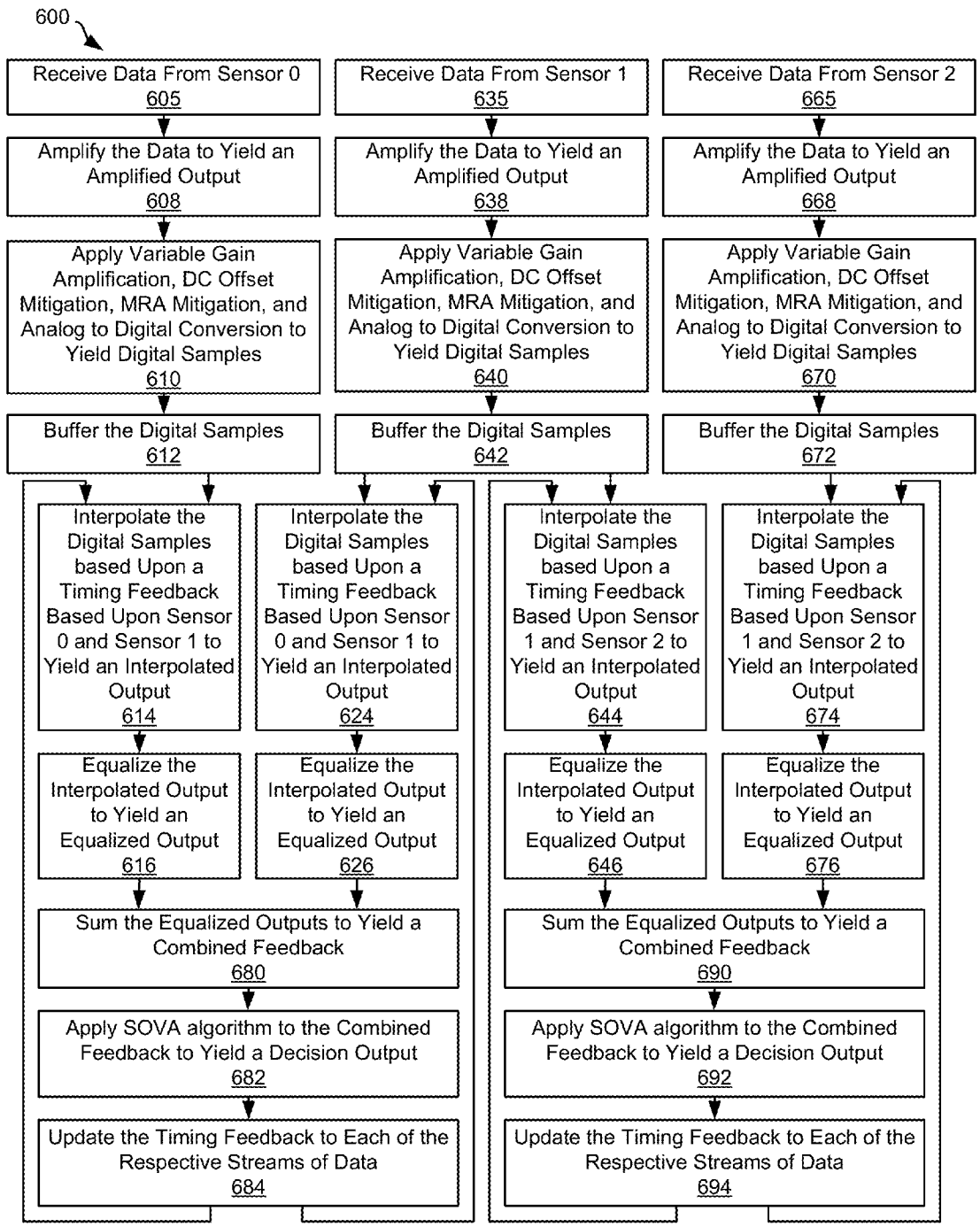
FIG. 6 is a flow diagram showing a method in accordance with various embodiments of the present invention for accessing codewords from two tracks in parallel.

Turning to FIG. 6, a flow diagram 600 shows a method in accordance with various embodiments of the present invention for accessing codewords from two tracks in parallel. Following flow diagram 600, data is received by a first sensor of three sensor read/write head (block 605) in parallel to receiving data from a second sensor of three sensor read/write head (block 635) and from a third sensor of three sensor read/write head (block 665). The first sensor is disposed primarily over a first track and the third sensor is disposed primarily over a second track with the second sensor disposed over both the first track and the second track similar to that discussed above in relation to FIGS. 5b and 5d above. The data received from each of the sensors may be a respective minute analog signal. The signal from the first sensor is amplified to yield an amplified output (block 608) in parallel with amplifying the signal from the second sensor to yield an amplified output (block 638) and amplifying the signal from the third sensor to yield an amplified output (block 668). The amplified signals derived from each of the sensors are then processed to apply a variable gain amplification, a DC offset mitigation, an MRA mitigation, and an analog to digital conversion (blocks 610, 640, 670) resulting in respective series of digital samples. The resulting series of digital samples are stored to respective buffers (block 612, 642, 672). These samples are provided to the respective buffers via a FIFO having an offset that accounts for the distance between the respective read sensors of three sensor read/write head. Thus, the samples in the respective buffers are substantially aligned with each other.

The FIFO aligned samples are accessed from the buffers and interpolated using respective digital interpolator circuits using a timing feedback generated based upon data derived from sensor 0 and sensor 1 to yield corresponding interpolated outputs (blocks 614, 624), and the FIFO aligned samples are accessed from the buffers and interpolated using a timing feedback generated based upon data derived from sensor 1 and sensor 2 to yield corresponding interpolated outputs (blocks 644, 674). During acquisition mode (i.e., the processing of header data associated with a user data set), the timing feedback may be generated using a circuit similar to that discussed above as acquisition portion 810 for the particular sensor discussed above in relation to FIG. 3c. During tracking mode (i.e., the processing of user data in the data set that follows the header data), the timing feedback may be generated using a circuit similar to that discussed above as tracking portion 840 discussed above in relation to FIG. 3c that is replicated for a combination of sensor 0 and sensor 1 and for a combination of sensor 1 and sensor 2. Using the timing feedback signals, the respective digital interpolation circuits modify the phase of the samples associated with the respective sensor of the three sensor read/write head. The interpolated output derived from each of the sample sets derived from the respective sensors of the three sensor read/write head is equalized using a digital finite impulse response filter circuit to yield an equalized output (blocks 616, 626, 646, 676)

The equalized outputs corresponding to the combination of sensor 0 and sensor 1 are summed to yield a combined feedback (block 680). A soft output Viterbi detection algorithm is applied to the combined feedback (from block 680) to yield a decision output (block 682). This decision output is provided to a timing loop during the tracking mode to yield an updated phase shift to be applied by the respective digital interpolation circuits to modify the phase of each of the respective streams of data derived from the sensors of the three sensor read/write head assembly (block 684). In some cases, this decision output is used to generate the $X_{ideal}$ input to tracking portion 840 discussed above in relation to FIG. 3c. In parallel, the equalized outputs corresponding to the combination of sensor 1 and sensor 2 are summed to yield a combined feedback (block 690) to yield a decision output (block 692). This decision output is provided to a timing loop during the tracking mode to yield an updated phase shift to be applied by the respective digital interpolation circuits to modify the phase of each of the respective streams of data derived from the sensors of the three sensor read/write head assembly (block 694). Again, in some cases, this decision output is used to generate the $X_{ideal}$ input to tracking portion 840 discussed above in relation to FIG. 3c.

Figure 7:
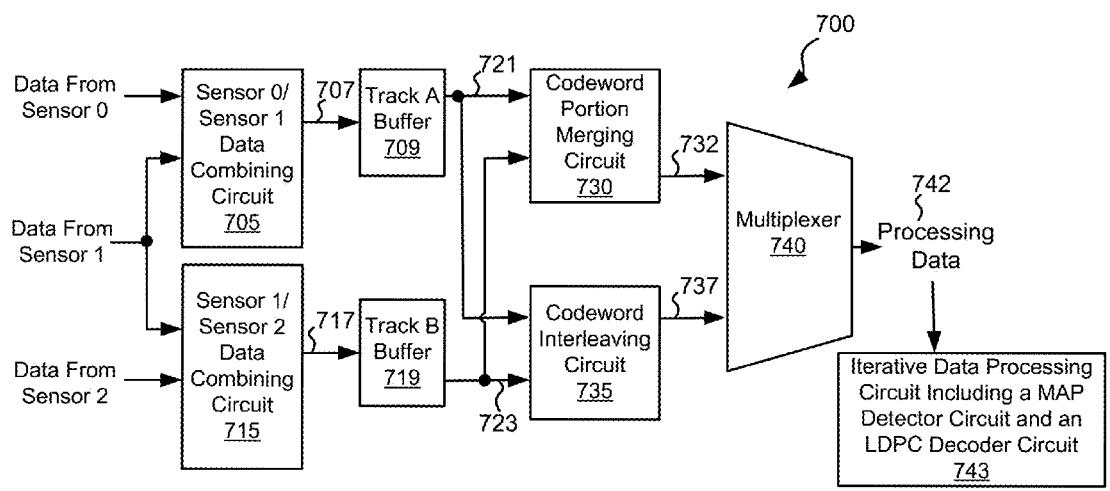
FIG. 7 is a parallel data combining circuit that may be used in relation to embodiments of the present invention accessing portions of codewords in parallel from different tracks and full codewords read in from different tracks.

Turning to FIG. 7, a parallel data combining circuit 700 is shown that may be used in relation to embodiments of the present invention accessing portions of codewords in parallel from different tracks and full codewords read in from different tracks. Parallel data combining circuit 700 includes: a sensor 0/sensor 1 data combining circuit 705 that combines the data corresponding to one track into a unified data output 707, and a sensor 1/sensor 2 data combining circuit 715 that combines the data corresponding to another track into another unified data output 717. Sensor 0/sensor 1 data combining circuit 705 combines information received from sensor 0 and sensor 1, and sensor 1/sensor 2 data combining circuit 715 combines information received from sensor 1 and sensor 2. Sensor 0/sensor 1 data combining circuit 705 and sensor 1/sensor 2 data combining circuit 715 may be implemented using any approach known in the art for combining data streams into a unified data stream. Based upon the disclosure provided herein, one of ordinary skill in the art will recognize a variety of implementations of sensor 0/sensor 1 data combining circuit 705 and sensor 1/sensor 2 data combining circuit 715 that may be used in relation to different embodiments of the present invention.

Unified data output 707 is stored to a track A buffer 709, and unified data output 717 is stored to a track B buffer 719. A codeword portion merging circuit 730 counts half of a codeword of data from each of a memory output 721 and a memory output 723 and generates a re-assembled codeword 732 by appending the half codeword from memory output 723 to the end of the half codeword from memory output 721. As an example, codeword portion merging circuit 730 performs the function graphically displayed in FIG. 5b of assembling the parallel codeword portions distributed across two tracks into the codewords in re-assembled data pattern 1508. In contrast, a codeword interleaving circuit 735 counts a full codeword of data from each of memory output 721 and memory output 723 and presents the full codewords as individual codewords 737. This process is designed to process data retrieved from a storage medium arranged as discussed above in relation to FIG. 5d. Individual codeword 737 and re-assembled codeword 732 are provided to a multiplexer circuit 740 that selects one to be provided as processing data 742. Where data is arranged on a storage medium as discussed above in relation to FIG. 5b, re-assembled codeword 732 is selected as processing data 742. Alternatively, where data is arranged on a storage medium as discussed above in relation to FIG. 5d, individual codeword 737 is selected as processing data 742.

Figure 8:
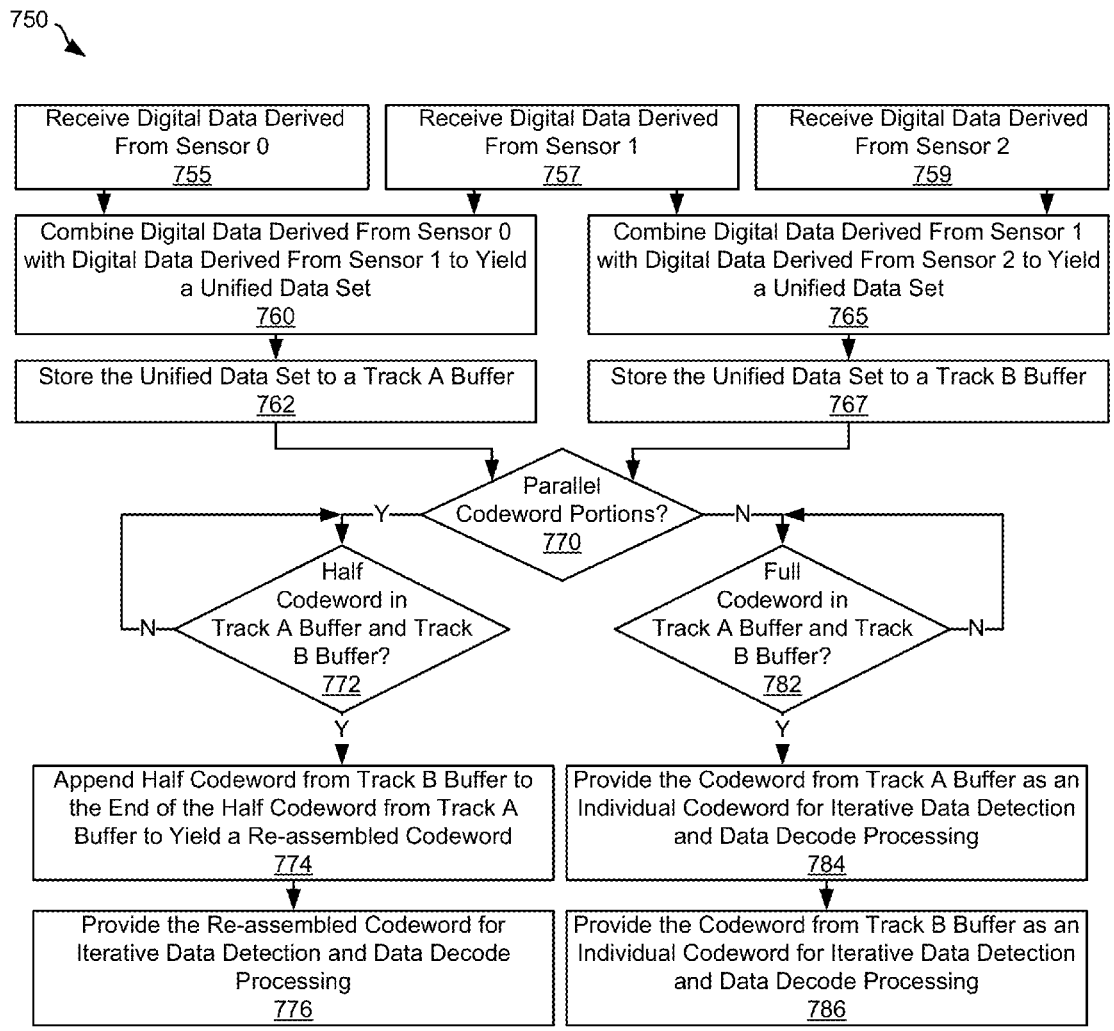
FIG. 8 is a flow diagram showing a method in accordance with some embodiments of the present invention for accessing parallel codewords data from two tracks in parallel using a three sensor read head.

Turning to FIG. 8, a flow diagram 750 shows a method in accordance with some embodiments of the present invention for accessing parallel codewords data from two tracks in parallel using a three sensor read head. Following flow diagram 750, digital data is received that is derived from each of a sensor 0, a sensor 1, and a sensor 2 (blocks 755, 757, 759). The digital data derived from sensor 1 is combined with the digital data derived from sensor 0 to make a unified data set (block 760). Similarly, the digital data derived from sensor 1 is combined with the digital data derived from sensor 2 to make another unified data set (block 765). Any approach known in the art for combining data sets derived from sensors disposed over tracks of a storage medium may be used in relation to different embodiments of the present invention. The unified data sets are respectively stored to a a track A buffer or a track B buffer (blocks 762, 767).

It is determined whether the data on the storage medium over which sensor 0, sensor 1, and sensor 2 are disposed is arranged in parallel codeword portions such as that discussed above in relation to FIG. 5b (block 770). Where the data is arranged in parallel codeword portions (block 770), it is determined whether a half of a codeword has been stored to both the track A buffer and the track B buffer (block 772). Where a half codeword has been stored to both the track A buffer and the track B buffer (block 772), the half codeword from the track B buffer is appended to the half codeword from the track A buffer to yield a re-assembled codeword (block 774). This re-assembled codeword is provided to an iterative data detection and decoding circuit for processing (block 776). In one particular embodiment of the present invention, the data detection circuit is a maximum a posteriori data detection circuit and the data decoding circuit is a low density parity check decoding circuit.

Alternatively, where the data is not arranged in parallel codeword portions (block 770), it is determined whether a full codeword has been stored to both the track A buffer and the track B buffer (block 782). Where a full codeword has been stored to both the track A buffer and the track B buffer (block 782), the full codeword from the track A buffer is provided as an individual codeword for processing by the iterative data detection and decoding circuit (block 784). Subsequently, the full codeword from the track B buffer is provided as an individual codeword for processing by the iterative data detection and decoding circuit (block 786).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/ or a mixed signal integrated circuit. It should also be noted that various functions of the blocks, systems or circuits discussed herein may be implemented in either software or firmware. In some such cases, the entire system, block or circuit may be implemented using its software or firmware equivalent, albeit such a system would not be a circuit. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data access system, the system comprising:
   a head including a first read sensor, a second read sensor and a third read sensor;
   a first interpolator circuit operable to modify the phase of a first data set derived from the first sensor based upon a first phase feedback to yield a first modified data set;
   a second interpolator circuit operable to modify the phase of a second data set derived from the second sensor based upon the first phase feedback to yield a second modified data set;
   a third interpolator circuit operable to modify the phase of the second data set derived from the second sensor based upon a second phase feedback to yield a third modified data set;
   a fourth interpolator circuit operable to modify the phase of the third data set derived from the third sensor based upon the second phase feedback to yield a fourth modified data set;
   a first offset determination circuit operable to provide the first phase feedback based upon a combination of the first modified data set and the second modified data set; and
   a second offset determination circuit operable to provide the second phase feedback based upon a combination of the third modified data set and the fourth modified data set.

2. The system of claim 1, wherein the first interpolator circuit, the second interpolator circuit, the third interpolator circuit, and the fourth interpolator circuit are digital interpolator circuits.

3. The system of claim 1, wherein modifying the phase of the first data set based upon the first phase feedback is done during a tracking mode post-header data is being processed.

4. The system of claim 3, wherein the first interpolator circuit is also operable to modify the phase of the first data set base upon a phase correction input during an acquisition mode when header data is being processed.

5. The system of claim 4, wherein the first offset determination circuit comprises:
   a first equalizer circuit operable to equalize the first modified data set to yield a first equalized data set;
   a second equalizer circuit operable to equalize the second modified data set to yield a second equalized data set;
   a summation circuit operable to sum the first equalized data set with the second equalized data set on an element by element basis to yield a sum;
   a data detector circuit operable to apply a data detection algorithm to the sum to yield a decision output; and
   a second order loop filter circuit operable to generate the first phase feedback using the decision output.

6. The system of claim 1, wherein the first phase determination circuit includes a Viterbi algorithm data detector circuit operable to determine decisions based upon a combination of both the first modified data set and the second modified data set.

7. The system of claim 1, wherein the system is implemented as part of an integrated circuit.

8. The system of claim 1, wherein the system is implemented as part of a storage device, and wherein the storage device further comprises:
the storage medium, wherein the head is disposable over the storage medium such that the first read sensor is disposed primarily over a first track on the storage medium and the third read sensor is disposed primarily over a second track of the storage medium while the second read sensor is partially disposed over both the first track and the second track.

9. The system of claim 1, wherein the system further comprises:
a first analog front end circuit applying a first variable gain to a first input derived from the first read sensor to yield a first analog output from which the first data set is derived;
a second analog front end circuit applying a second variable gain to a second input derived from the second read sensor to yield a second analog output from which the second data set is derived; and
a third analog front end circuit applying a third variable gain to a third input derived from the third read sensor to yield a third analog output from which the third data set is derived.

10. The system of claim 9, wherein the second variable gain is controlled based upon a combination of the second modified data set and the third modified data set.

11. A storage access system, the system comprising:
a first interpolator circuit operable to modify the phase of a first data set derived from a first sensor based upon a first phase feedback to yield a first modified data set;
a second interpolator circuit operable to modify the phase of a second data set derived from a second sensor based upon a second phase feedback to yield a second modified data set;
a third interpolator circuit operable to modify the phase of a third data set derived from a third sensor based upon a third phase feedback to yield a third modified data set; and
an offset determination circuit operable to provide the first phase feedback, wherein the offset determination circuit includes:
an acquisition mode offset calculation circuit operable to calculate a first phase offset based upon a first input data set derived from the first sensor;
a tracking mode offset calculation circuit operable to calculate a second phase offset based upon the first input data set; and
a selector circuit operable to: select the first phase offset as a phase update when processing header data, and select the second phase offset as the phase update when processing post header data, wherein the first phase feedback is calculated based upon the phase update.

12. The system of claim 11, wherein the acquisition mode offset calculation circuit includes a zero phase sequence calculation circuit.

13. The system of claim 11, wherein the tracking mode offset calculation circuit includes a second order timing loop circuit.

14. The system of claim 11, wherein the offset determination circuit further comprises a summation circuit operable to subtract the first phase feedback from the phase update to update the first phase feedback.

15. The system of claim 11, wherein the offset determination circuit is a first offset determination circuit, the acquisition mode offset calculation circuit is a first acquisition mode offset calculation circuit, the tracking mode offset calculation circuit is a first tracking mode offset calculation circuit, the selector circuit is a first selector circuit, the phase update is a first phase update, and wherein the system further comprises:
a second offset determination circuit operable to provide the second phase feedback, wherein the second offset determination circuit includes:
a second acquisition mode offset calculation circuit operable to calculate a third phase offset based upon a second input data set derived from the second sensor;
a second tracking mode offset calculation circuit operable to calculate a fourth phase offset based upon the second input data set;
a second selector circuit operable to: select the third phase offset as a second phase update when processing header data, and select the fourth phase offset as the second phase update when processing post header data, wherein the second phase feedback is calculated based upon the second phase update; and
a third offset determination circuit operable to provide the third phase feedback, wherein the third offset determination circuit includes:
a third acquisition mode offset calculation circuit operable to calculate a fifth phase offset based upon a third input data set derived from the third sensor;
a third tracking mode offset calculation circuit operable to calculate a sixth phase offset based upon the second input data set;
a third selector circuit operable to: select the fifth phase offset as a third phase update when processing header data, and select the sixth phase offset as the third phase update when processing post header data, wherein the third phase feedback is calculated based upon the third phase update.

16. The system of claim 15, wherein the system further comprises:
a first summation circuit operable to subtract the second phase update from the first phase update to yield a first sum;
a second summation circuit operable to subtract the third phase update from the first phase update to yield a second sum; and
a third summation circuit operable to subtract the third phase update from the second phase update to yield a third sum.

17. The system of claim 16, wherein the system further comprises:
a fourth summation circuit operable to subtract the first phase feedback from the first sum to update the first phase feedback;
a fifth summation circuit operable to subtract the second phase feedback from the second sum to update the second phase feedback; and
a sixth summation circuit operable to subtract the third phase feedback from the third sum to update the third phase feedback.

18. A data processing system, the system comprising:
a head including a first read sensor, a second read sensor and a third read sensor disposable over a storage medium such that the first read sensor is disposed primarily over a first track on the storage medium and the third read sensor is disposed primarily over a second track of the storage medium while the second read sensor is partially disposed over both the first track and the second track;

a first means for modifying the phase of a first data set derived from the first sensor based upon a first phase feedback to yield a first modified data set;

a second means for modifying the phase of a second data set derived from the second sensor based upon the first phase feedback to yield a second modified data set;

a third means for modifying the phase of the second data set derived from the second sensor based upon a second phase feedback to yield a third modified data set;

a fourth means for modifying the phase of the third data set derived from the third sensor based upon the second phase feedback to yield a fourth modified data set;

a fifth means for generating the first phase feedback, wherein the first phase feedback is generated based at least in part using a combination of the first modified data set and the second modified data set; and a sixth means for generating the second phase feedback, wherein the second phase feedback is generated based at least in part upon a combination of the third modified data set and the fourth modified data set.

19. The system of claim 11, wherein:
the first means is a first digital interpolator circuit;
the second means is a second digital interpolator circuit;
the third means is a third digital interpolator circuit; and
the fourth means is a fourth digital interpolator circuit.

20. The system of claim 11, wherein:
the fifth means is a first offset determination circuit comprising:
    a first equalizer circuit operable to equalize the first modified data set to yield a first equalized data set;
    a second equalizer operable to equalize the second modified data set to yield a second equalized data set;
    a summation circuit operable to sum the first equalized data set with the second equalized data set on an element by element basis to yield a sum;
    a data detector circuit operable to apply a data detection algorithm to the sum to yield a decision output; and
    a second order loop filter circuit operable to generate the first phase feedback using the decision output.

\* \* \* \* \*